(12) United States Patent
Kobayashi

(10) Patent No.: US 11,528,438 B2
(45) Date of Patent: Dec. 13, 2022

(54) PHOTOELECTRIC CONVERSION DEVICE

(71) Applicant: CANON KABUSHIKI KAISHA, Tokyo (JP)

(72) Inventor: Daisuke Kobayashi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/588,952

(22) Filed: Jan. 31, 2022

(65) Prior Publication Data
US 2022/0247961 A1    Aug. 4, 2022

(30) Foreign Application Priority Data

Feb. 4, 2021  (JP) .............................. JP2021-016652

(51) Int. Cl.
*H04N 5/374*       (2011.01)
*H04N 5/3745*     (2011.01)
*H04N 5/378*       (2011.01)

(52) U.S. Cl.
CPC ........... *H04N 5/3741* (2013.01); *H04N 5/378* (2013.01); *H04N 5/37455* (2013.01); *H04N 5/37457* (2013.01)

(58) Field of Classification Search
None
See application file for complete search history.

(56) References Cited

U.S. PATENT DOCUMENTS

2014/0263966 A1*  9/2014  Hikosaka ............. H04N 5/3577
                                                                250/208.1
2020/0265909 A1    8/2020  Matsuura

FOREIGN PATENT DOCUMENTS

JP    2003169257 A    6/2003
WO    2019069614 A1   4/2019

* cited by examiner

*Primary Examiner* — Mark T Monk
(74) *Attorney, Agent, or Firm* — Canon U.S.A., Inc. IP Division

(57) ABSTRACT

The photoelectric conversion device includes pixels arranged in a plurality of columns, a plurality of output lines from which signals are output from the pixels, and a plurality of column circuits provided corresponding to the plurality of output lines. The column circuit includes first and second sample-and-hold circuits for holding first and second signals. The sample-and-hold circuits include first switches provided between the output line and each unit capacitor, and second switches provided between first electrodes of adjacent unit capacitors. The second electrodes of the unit capacitor of the first sample-and-hold circuit are connected to each other by a first interconnection, and the second electrodes of the unit capacitor of the second sample-and-hold circuit are connected to each other by a second interconnection. The second switches are arranged along a first direction parallel to the plurality of columns, and the first and second interconnections extend along the first direction.

20 Claims, 20 Drawing Sheets

PHOTOELECTRIC CONVERSION DEVICE

BACKGROUND

Field of the Disclosure

The aspect of the embodiments relates to a photoelectric conversion device.

Description of the Related Art

International Publication No. WO2019/069614 discloses a solid-state imaging device including a sample-and-hold unit that holds a signal output from a pixel. The sample-and-hold unit disclosed in International Publication No. WO2019/069614 includes two sample-and-hold circuits in parallel with respect to one vertical signal line, and at least one of the two sample-and-hold circuits has at least two sampling capacitors.

The sample-and-hold unit described in International Publication No. WO2019/069614 may have a function of removing noise by a correlated double sampling (CDS) process. However, International Publication No. WO2019/069614 does not describe a specific technique for improving the accuracy of correction processing by CDS in the sample-and-hold unit.

SUMMARY OF THE DISCLOSURE

According to an aspect of the embodiments, there is provided a photoelectric conversion device including a pixel array unit in which a plurality of pixels each including a photoelectric converter is arranged to form a plurality of columns, a plurality of output lines that is provided corresponding to the plurality of columns and each of which a first signal and a second signal are to be output from the pixel, and a plurality of column circuits that is provided corresponding to the plurality of output lines, wherein each of the plurality of column circuits includes a sample-and-hold unit including a first sample-and-hold circuit that holds the first signal and a second sample-and-hold circuit that holds the second signal, wherein each of the first sample-and-hold circuit and the second sample-and-hold circuit includes a plurality of unit capacitors and a switch circuit provided between the output line and the plurality of unit capacitors, wherein the switch circuit includes a plurality of first switches respectively provided between the output line and first electrodes of the plurality of unit capacitors, and a plurality of second switches respectively provided between the first electrodes of adjacent unit capacitors, wherein second electrodes of the plurality of unit capacitors of the first sample-and-hold circuit are connected to each other by a first interconnection, and second electrodes of the plurality of unit capacitors of the second sample-and-hold circuit are connected to each other by a second interconnection, wherein the plurality of second switches constituting the switch circuits of the first sample-and-hold circuit and the second sample-and-hold circuit are arranged along a first direction parallel to the plurality of columns, and wherein the first interconnection and the second interconnection extend along the first direction.

According to another aspect of the embodiments, there is provided a photoelectric conversion device including a pixel array unit in which a plurality of pixels each including a photoelectric converter is arranged to form a plurality of columns, a plurality of output lines that is provided corresponding to the plurality of columns and each of which a first signal and a second signal are to be output from the pixel, and a plurality of column circuits that is provided corresponding to the plurality of output lines, wherein each of the plurality of column circuits includes a sample-and-hold unit including a first sample-and-hold circuit that holds the first signal and a second sample-and-hold circuit that holds the second signal, wherein each of the first sample-and-hold circuit and the second sample-and-hold circuit includes a plurality of unit capacitors and a switch circuit provided between the output line and the plurality of unit capacitors, wherein the switch circuit includes a plurality of first switches respectively provided between the output line and first electrodes of the plurality of unit capacitors, and a plurality of second switches respectively provided between the first electrodes of adjacent unit capacitors, and wherein the unit capacitors of the first sample-and-hold circuit and the unit capacitors of the second sample-and-hold circuit are alternately arranged adjacent to each other along a first direction parallel to the plurality of columns.

Further features of the disclosure will become apparent from the following description of exemplary embodiments with reference to the attached drawings.

DESCRIPTION OF THE EMBODIMENTS

Exemplary embodiments of the disclosure will now be described in detail in accordance with the accompanying drawings.

First Embodiment

Figure 1:
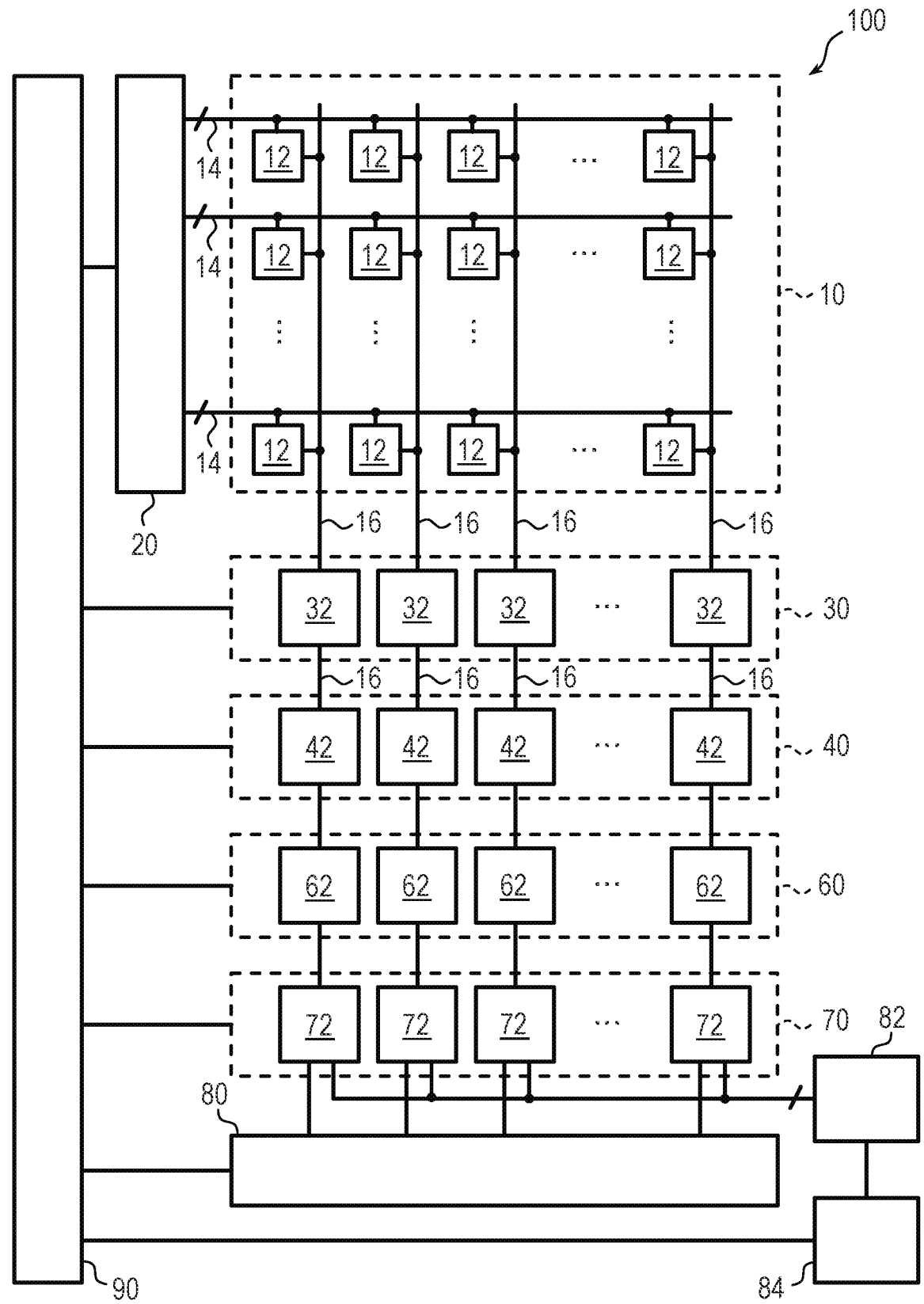
FIG. 1 is a block diagram illustrating a schematic configuration of a photoelectric conversion device according to a first embodiment of the disclosure.

The general configuration of a photoelectric conversion device according to a first embodiment of the disclosure will be described with reference to FIG. 1. FIG. 1 is a block diagram illustrating a schematic configuration of the photoelectric conversion device according to the present embodiment.

As illustrated in FIG. 1, the photoelectric conversion device 100 according to the present embodiment includes a pixel array unit 10, a vertical scanning unit 20, a signal processing unit 30, a sample-and-hold unit 40, an analog-to-digital conversion unit (AD conversion unit) 60, and a digital memory unit 70. The photoelectric conversion device 100 further includes a horizontal scanning unit 80, a digital signal processing unit 82, an output unit 84, and a control unit 90.

The pixel array unit 10 is provided with a plurality of pixels 12 arranged in matrix over a plurality of rows and a plurality of columns. FIG. 1 illustrates a part of the pixels 12 constituting the pixel array unit 10 for convenience. In addition to effective pixels that output pixel signals corresponding to the amount of incident light, optical black pixels in which the photoelectric converter is shielded from light, dummy pixels that do not output signals, and the like may be arranged in the pixel array unit 10. The number of pixels 12 constituting the pixel array unit 10 is not particularly limited. A specific configuration example of the pixel 12 will be described later.

In each row of the pixel array unit 10, a control line 14 is arranged so as to extend in a first direction (a lateral direction in FIG. 1). The control line 14 is connected to the pixels 12 aligned in the first direction, and forms a signal line common to these pixels 12. The first direction in which the control lines 14 extend may be referred to as a row direction or a horizontal direction. The row direction is a direction parallel to the plurality of rows. Each of the control lines 14 may include a plurality of signal lines for supplying a plurality of types of control signals to the pixels 12. The control line 14 in each row is connected to the vertical scanning unit 20.

In each column of the pixel array unit 10, an output line 16 is arranged so as to extend in a second direction (vertical direction in FIG. 1) intersecting the first direction. Each of the output lines 16 is connected to the pixels 12 aligned in the second direction, and forms a signal line common to these pixels 12. The second direction in which the output lines 16 extend may be referred to as a column direction or a vertical direction. The column direction is a direction parallel to the plurality of columns. The output line 16 is connected to the signal processing unit 30.

The vertical scanning unit 20 is a control unit having a function of receiving a control signal output from the control unit 90, generating control signals for driving the pixels 12, and supplying the control signals to the pixels 12 via the control lines 14. A logic circuit such as a shift register or an address decoder may be used for the vertical scanning unit 20. The vertical scanning unit 20 sequentially scans the pixels 12 in the pixel array unit 10 row by row, and outputs pixel signals of the pixels 12 to the signal processing unit 30 via the output lines 16.

The signal processing unit 30 includes a plurality of column signal processing units 32 provided corresponding to the respective columns of the pixel array unit 10. The column signal processing unit 32 of each column is connected to the output line 16 of the corresponding column. Each of the column signal processing units 32 may include a current source for supplying a bias current to the pixel 12 via the output line 16, an amplifier, or the like.

The sample-and-hold unit 40 includes a plurality of column sample-and-hold units 42 provided corresponding to the respective columns of the pixel array unit 10. Each of the column sample-and-hold units 42 is connected to a column signal processing unit 32 of the corresponding column. The column sample-and-hold unit 42 has a function of sampling and holding a signal output from the column signal processing unit 32. A specific configuration example of the column sample-and-hold unit 40 will be described later.

The AD conversion unit 60 includes a plurality of column AD conversion units 62 provided corresponding to the respective columns of the pixel array unit 10. Each of the column AD conversion units 62 is connected to a column sample-and-hold unit 42 of the corresponding column. The column AD conversion unit 62 has a function of converting a signal output from the column sample-and-hold unit 42 from an analog signal to a digital signal.

The digital memory unit 70 includes a plurality of column memory units 72 provided corresponding to the respective columns of the pixel array unit 10. Each of the column memory units 72 is connected to the column AD conversion unit 62 of the corresponding column. The column memory unit 72 has a function of holding the digital signal output from the column AD conversion unit 62.

The column signal processing unit 32, the column sample-and-hold unit 42, the column AD conversion unit 62, and the column memory unit 72 provided corresponding to each column of the pixel array unit 10 may be referred to as a column circuit. That is, the signal processing unit 30, the sample-and-hold unit 40, the AD conversion unit 60, and the digital memory unit 70 constitute a plurality of column circuits corresponding to the number of pixel columns constituting the pixel array unit 10.

The horizontal scanning unit 80 is a control unit having a function of receiving a control signal output from the control unit 90, generating control signals for outputting digital signals held in the digital memory unit 70, and supplying the control signals to the digital memory unit 70. A logic circuit such as a shift register or an address decoder may be used for the horizontal scanning unit 80. A control line of the horizontal scanning unit 80 provided corresponding to each column of the pixel array unit 10 is connected to the column memory unit 72 of the corresponding column. When the column memory unit 72 of each column receives the control signal via the control line of the corresponding column of the horizontal scanning unit 80, the column memory unit 72 outputs the digital signal held therein to the digital signal processing unit 82.

The digital signal processing unit (DFE: Digital Front End) 82 is a circuit unit that performs predetermined signal processing on the digital signal output from the digital memory unit 70. Examples of the processing executed by the digital signal processing unit 82 include amplification processing and correction processing.

The output unit 84 includes an external interface circuit and is a circuit unit that outputs the signal processed by the digital signal processing unit 82 to the outside of the photoelectric conversion device 100. The external interface circuit included in the output unit 84 is not particularly limited. As the external interface circuit, for example, SerDes (SERializer/DESerializer) transmission circuits such as LVDS (Low Voltage Differential Signaling) circuits and SLVS (Scalable Low Voltage Signaling) circuits may be applied.

The control unit 90 is a circuit unit that supplies control signals for controlling operations and timings of the vertical scanning unit 20, the signal processing unit 30, the sample-and-hold unit 40, the AD conversion unit 60, the digital memory unit 70, the horizontal scanning unit 80, and the output unit 84. All of these control signals need not be supplied from the control unit 90, and at least a part of these control signals may be supplied from the outside of the photoelectric conversion device 100.

Figure 2:
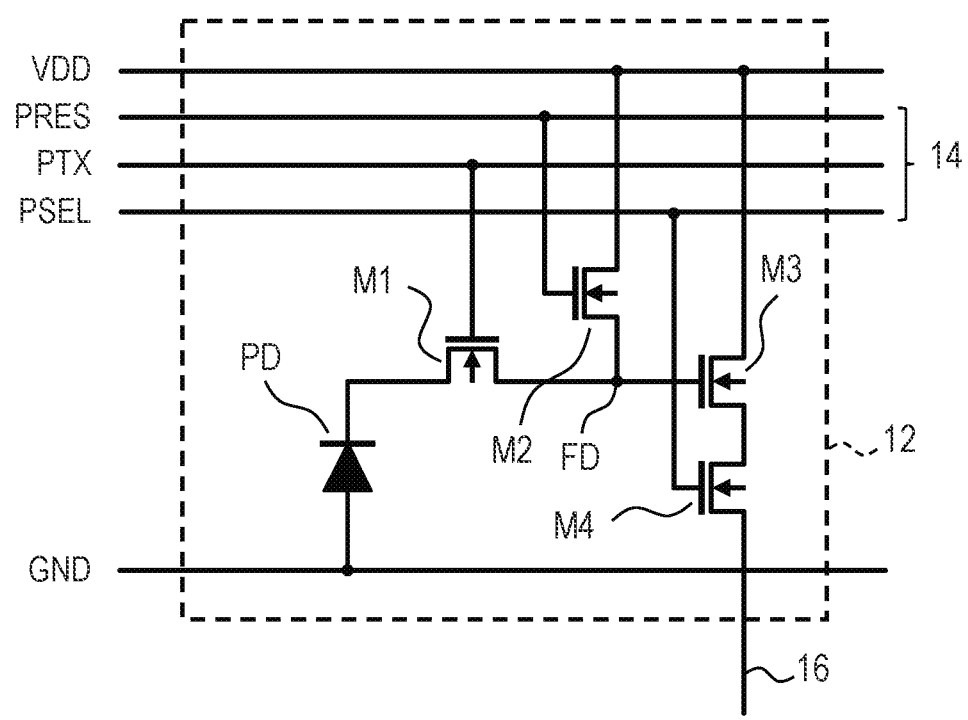
FIG. 2 is a circuit diagram illustrating a configuration example of a pixel in the photoelectric conversion device according to the first embodiment of the disclosure.

Next, a configuration example of the pixel 12 in the photoelectric conversion device 100 according to the present embodiment will be described with reference to FIG. 2. FIG. 2 is a circuit diagram illustrating a configuration example of the pixel in the photoelectric conversion device according to the present embodiment.

Each of the pixels 12 may be the smallest unit of circuitry that is repeatedly arranged to construct an image. As illustrated in FIG. 2, each of the pixels 12 may include a photoelectric converter PD, a transfer transistor M1, a reset transistor M2, an amplifier transistor M3, and a select transistor M4. The transfer transistor M1, the reset transistor M2, the amplifier transistor M3, and the select transistor M4 may be n-channel MOS transistors, for example, but may be p-channel MOS transistors or other known switch elements. Each of the pixels 12 may have a microlens and a color filter arranged in an optical path until incident light is guided to the photoelectric converter PD. The microlens focuses incident light on the photoelectric converter PD. The color filter selectively transmits light of a predetermined color.

The photoelectric converter PD may be, for example, a photodiode. The photodiode constituting the photoelectric converter PD has an anode connected to the ground node (GND) and a cathode connected to the source of the transfer transistor M1. The drain of the transfer transistor M1 is connected to the source of the reset transistor M2 and the gate of the amplifier transistor M3. A connection node between the drain of the transfer transistor M1, the source of the reset transistor M2, and the gate of the amplifier transistor M3 is a so-called floating diffusion portion FD. The floating diffusion portion FD includes a capacitance component (floating diffusion capacitor) and functions as a charge holding portion. The floating diffusion capacitor may include a p-n junction capacitor, an interconnection capacitor, and the like.

The drain of the reset transistor M2 and the drain of the amplifier transistor M3 are connected to a power supply voltage node (voltage VDD). The source of the amplifier transistor M3 is connected to the drain of the select transistor M4. The source of the select transistor M4 is connected to the output line 16.

In the case of the pixel configuration of FIG. 2, the control line 14 in each row arranged in the pixel array unit 10 include three signal lines to which the control signals PRES, PTX, and PSEL from the vertical scanning unit 20 are supplied. The signal line to which the control signal PRES is supplied is connected to the gates of the reset transistors M2 of the pixels 12 belonging to the corresponding row, and forms a common signal line for these pixels 12. The signal line to which the control signal PTX is supplied is connected to the gates of the transfer transistors M1 of the pixels 12 belonging to the corresponding row, and forms a common signal line for these pixels 12. The signal line to which the control signal PSEL is supplied is connected to the gates of the select transistors M4 of the pixels 12 belonging to the corresponding row, and forms a common signal line for these pixels 12. When each transistor constituting the pixel 12 is formed of an n-channel transistor, when a control signal of High level (hereinafter referred to as "H level") is supplied from the vertical scanning unit 20, the corresponding transistor is turned on (conductive state). When a control signal of Low level (hereinafter referred to as "L level") is supplied from the vertical scanning unit 20, the corresponding transistor is turned off (non-conductive state).

Figure 3:
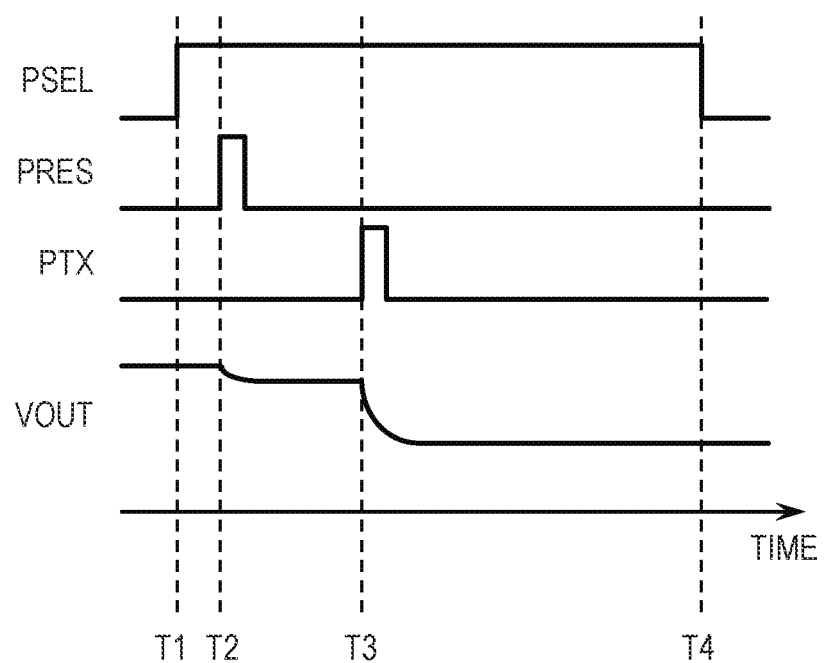
FIG. 3 is a timing chart illustrating the operation of the pixel in the photoelectric conversion device according to the first embodiment of the disclosure.

Next, the operation of the pixel 12 in the photoelectric conversion device 100 according to the present embodiment will be described with reference to FIG. 2 and FIG. 3. FIG. 3 is a timing chart illustrating the operation of the pixel in the photoelectric conversion device according to the present embodiment.

The photoelectric converter PD converts (photoelectrically converts) the incident light into an amount of charge corresponding to the amount of light, and accumulates the generated charge. The transfer transistor M1 has a function as a transfer unit that transfers charge held by the photoelectric converter PD to the floating diffusion portion FD when the transfer transistor M1 is turned on. The floating diffusion portion FD has a function as a charge holding portion that holds charge transferred from the photoelectric converter PD, and becomes a voltage corresponding to the amount of charge transferred from the photoelectric converter PD by charge-voltage conversion by the floating diffusion capacitor. The amplifier transistor M3 has a configuration in which a power supply voltage is supplied to the drain thereof and a bias current is supplied to the source thereof from a current source (not illustrated) via the output line 16 and the select transistor M4, and constitutes an amplifier unit (source follower circuit) having a gate as an input node. The select transistor M4 is a switch for selecting the pixel 12, and is turned on to connect the amplifier transistor M3 to the output line 16. Thus, the amplifier transistor M3 outputs a signal corresponding to the voltage of the floating diffusion portion FD to the output line 16 via the select transistor M4. When the reset transistor M2 is turned on, the floating diffusion portion FD is reset to a voltage corresponding to the power supply voltage.

FIG. 3 is a timing chart illustrating a pixel signal readout operation from the pixel 12 to the output line 16. FIG. 3 illustrates the timing of the control signals PSEL, PRES, and PTX output from the vertical scanning unit 20 to one row, and the output potential VOUT output from the pixel 12 to the output line 16 of the corresponding column. It is assumed that the control signals PSEL, PRES, and PTX are at the L level during a period before the time T1. Further, it is assumed that charge corresponding to the amount of incident light is accumulated in the photoelectric converter PD.

At time T1, the vertical scanning unit 20 controls the control signal PSEL from L level to H level. Thus, the select transistor M4 is turned on, and the source of the amplifier transistor M3 is connected to the output line 16 via the select transistor M4.

During a predetermined period from the subsequent time T2, the vertical scanning unit 20 controls the control signal PRES from the L level to the H level. Thus, the reset transistor M2 is turned on, and the floating diffusion portion FD is reset to a predetermined potential (reset potential) corresponding to the voltage VDD. This state is the reset state of the pixel 12. Thus, the output potential VOUT of the output line 16 becomes a potential corresponding to the reset potential of the floating diffusion portion FD. This potential is held in the sample-and-hold unit 40 as a reset signal (also referred to as "N-signal") during a period until time T3 after the reset transistor M2 is turned off and the potential of the output line 16 is fixed.

During a predetermined period from the subsequent time T3, the vertical scanning unit 20 controls the control signal PTX from the L level to the H level. Thus, the transfer transistor M1 is turned on, the charge accumulated in the photoelectric converter PD is transferred to the floating diffusion portion 1-D, and the floating diffusion portion FD becomes a voltage corresponding to the amount of charge transferred from the photoelectric converter. Thus, the output potential VOUT of the output line 16 becomes a potential corresponding to the amount of charge transferred to the floating diffusion portion FD. This potential is held in the sample-and-hold unit 40 as a light detection signal (also referred to as "S-signal") during a period until time T4 after the transfer transistor M1 is turned off and the potential of the output line 16 is fixed.

At a subsequent time T4, the vertical scanning unit 20 controls the control signal PSEL from the H level to the L level. As a result, the select transistor M4 is turned off, the source of the amplifier transistor M3 is disconnected from the output line 16, and the operation of reading out pixel signals from the pixels 12 belonging to the one row to the output line 16 is completed.

Next, the sample-and-hold unit 40 in the photoelectric conversion device 100 according to the present embodiment will be described with reference to FIG. 4 to FIG. 11.

Figure 4:
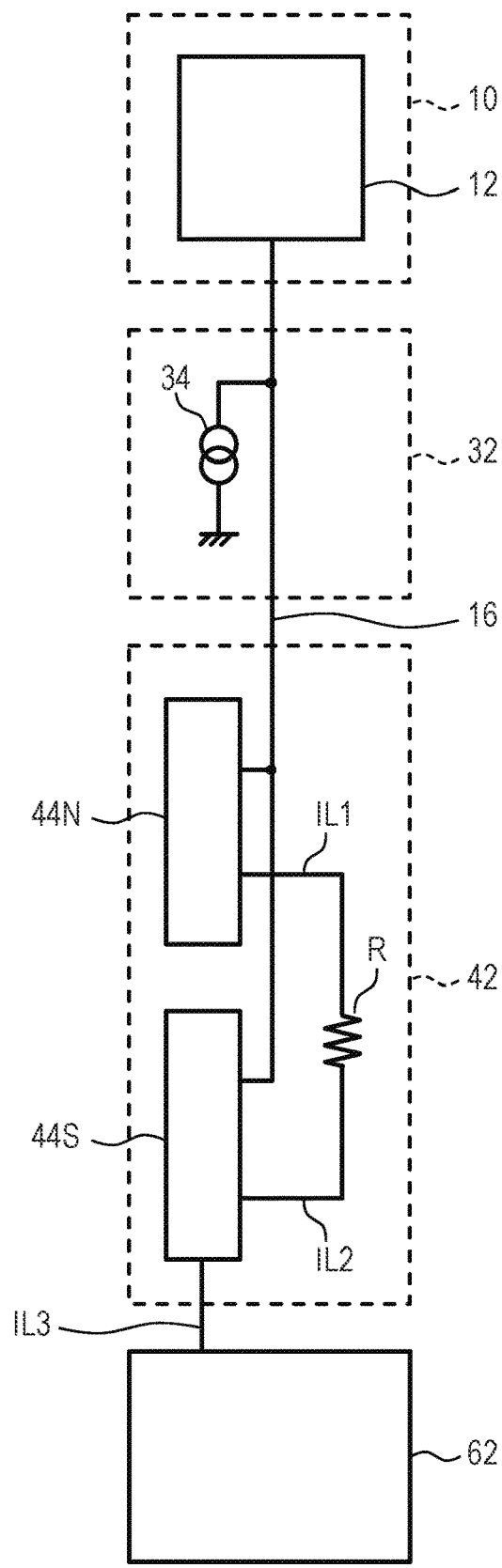
FIG. 4 is a block diagram illustrating a configuration example of a column circuit in the photoelectric conversion device according to the first embodiment of the disclosure.

FIG. 4 illustrates one pixel 12, a column signal processing unit 32, a column sample-and-hold unit 42, and a column AD conversion unit 62 corresponding to one of the plurality of columns constituting the pixel array unit 10.

The column signal processing unit 32 includes a current source 34 connected to the output line 16. The amplifier transistor M3 of the pixel 12 receives the bias current supplied from the current source 34 and forms a source follower circuit.

As illustrated in FIG. 4, the column sample-and-hold unit 42 includes an N-signal sample-and-hold circuit 44N, an S-signal sample-and-hold circuit 44S, and a resistor R. The N-signal sample-and-hold circuit 44N has a node connected to the output line 16 and a node connected to an interconnection IL1. The S-signal sample-and-hold circuit 44S has a node connected to the output line 16, a node connected to an interconnection IL2, and a node connected to an interconnection IL3. The N-signal sample-and-hold circuit 44N and the S-signal sample-and-hold circuit 44S are connected via the interconnection IL1, the resistor R, and the interconnection IL2. The interconnection IL3 is connected to the column AD conversion unit 62.

The N-signal sample-and-hold circuit 44N has a function of acquiring and holding the reset signal output from the pixel 12 via the output line 16. The S-signal sample-and-hold circuit 44S has a function of acquiring and holding the light detection signal output from the pixel 12 via the output line 16. The N-signal sample-and-hold circuit 44N is connected to the S-signal sample-and-hold circuit 44S via the interconnection IL1, the resistor R, and the interconnection IL2, and supplies a current based on the reset signal held in the N-signal sample-and-hold circuit 44N to the S-signal sample-and-hold circuit 44S. The S-signal sample-and-hold circuit 44S outputs a current based on the difference between the light detection signal and the reset signal to the column AD conversion unit 62 via the interconnection IL3. Thus, correction processing by correlated double sampling (CDS) of the light detection signal and the reset signal is performed.

Figure 5:
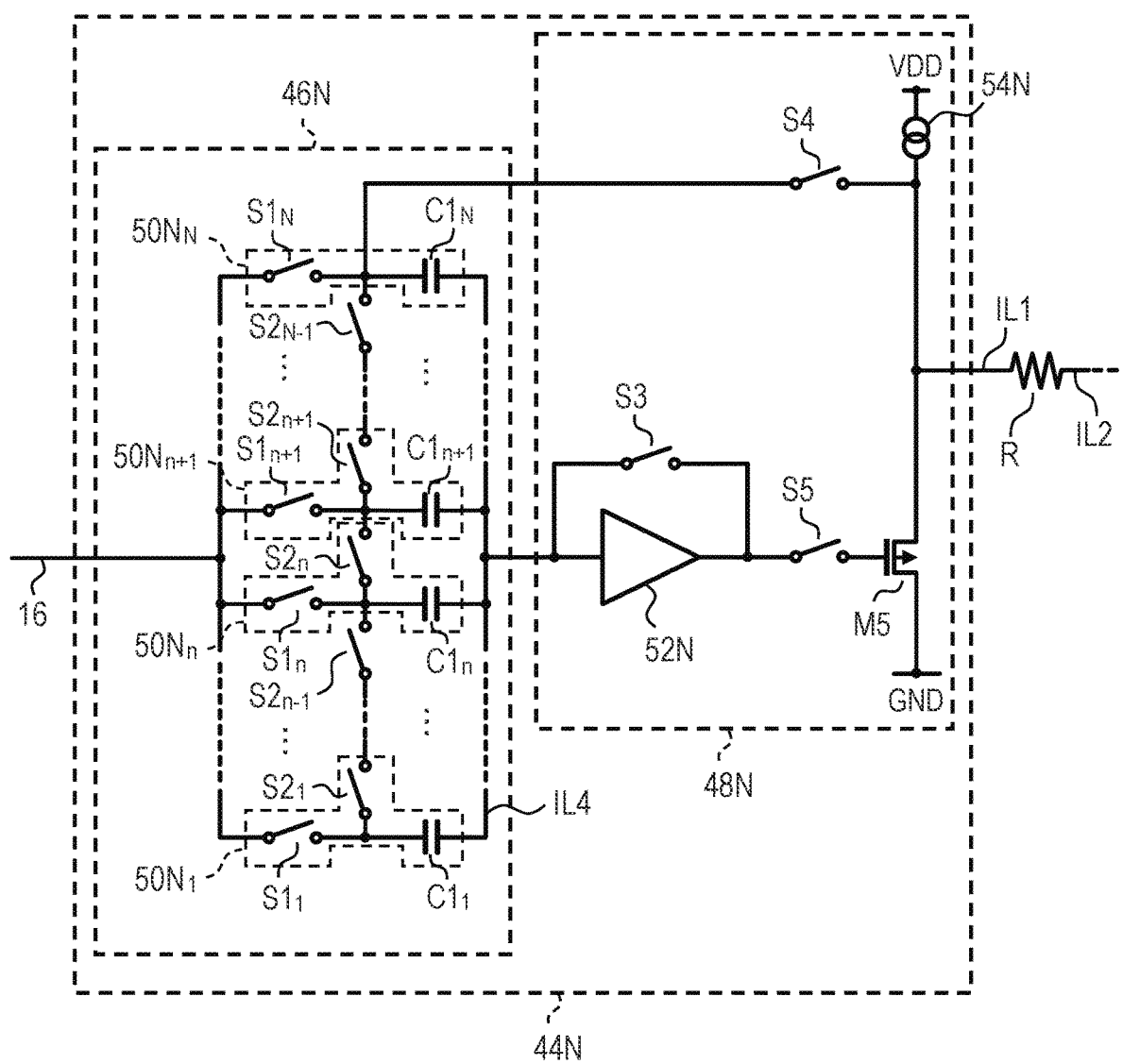
FIG. 5 is a circuit diagram illustrating a configuration example of an N-signal sample-and-hold circuit in the photoelectric conversion device according to the first embodiment of the disclosure.

FIG. 5 is a circuit diagram illustrating an example of the configuration of the N-signal sample-and-hold circuit 44N. As illustrated in FIG. 5, the N-signal sample-and-hold circuit 44N includes a capacitor unit 46N and an amplifier unit 48N.

The capacitor unit 46N includes a plurality of (N) unit capacitor portions $50N_1, \ldots, 50N_n, 50N_{n+1}, \ldots 50N_N$ (N is an integer of 2 or more, and n is an integer of 1 or more and less than N). Each of the unit capacitor portions $50N_1$ to $50N_{N-1}$ includes a switch S1, a switch S2, and a capacitor C1. The unit capacitor portion $50N_N$ includes a switch S1 and a capacitor C1. In FIG. 5, in order to indicate the unit capacitor portion SON to which the switch S1, the switch S2, and the capacitor C1 belong, these reference numerals are given the same consecutive numbers as the unit capacitor portion 50N. For example, the constituent elements of the unit capacitor portion $50N_1$ are represented by a switch $S1_1$, a switch $S2_1$, and a capacitor $C1_1$.

The amplifier unit 48N includes an inverting amplifier 52N, a current source MN, a transistor M5, and switches S3, S4, and S5. The transistor M5 is a p-channel transistor. The switches $S1_1$ to $S1_N$, the switches $S2_1$ to $S2_{N-1}$, the switch S3, the switch S4, and the switch S5 are controlled to be turned on or off in accordance with a control signal supplied from the control unit 90.

In each of the unit capacitor portions $50N_1$ to $50N_N$, one terminal of the switch S1 is connected to the output line 16. The other terminal of the switch S1 is connected to one terminal of the capacitor C1. The other terminal of the capacitor C1 is connected to an interconnection IL4. That is, one terminal of the switch S1 of the unit capacitor portions $50N_1$ to $50N_N$ is commonly connected to the output line 16, and the other terminal of the capacitor C1 of the unit capacitor portions $50N_1$ to $50N_N$ is commonly connected to the interconnection IL4. In other words, the unit capacitor portions $50N_1$ to $50N_N$ are connected in parallel between the output line 16 and the interconnection IL4. The interconnection IL4 connects the unit capacitor portions $50N_1$ to $50N_N$ and the amplifier unit 48N.

The switches S2 of the unit capacitor portions $50N_1$ to $50N_{N-1}$ are connected between the connection nodes of the switches S1 and the capacitor C1 of adjacent unit capacitor portions 50N. That is, when n is an integer of 1 to N-1, a connection node between the switch $S1_n$ and the capacitor $C1_n$ of the unit capacitor portion $50N_n$ is connected to a connection node between the switch $S1_{n+1}$ and the capacitor $C1_{n+1}$ of the unit capacitor portion $50N_{n+1}$ via the switch $S2_n$.

The capacitor C1 is a unit capacitor serving as a structural unit of a sampling capacitor constituting the N-signal sample-and-hold circuit 44N. The plurality of switches S1 and the plurality of switches S2 constituting the capacitor unit 46N constitute a switch circuit for constituting a sampling capacitor by combining the plurality of capacitors C1. The plurality of switches S1 has a function of selectively switching a connection state between the output line 16 and the plurality of capacitors C1. The plurality of switches S2 has a function of selectively switching a connection state between one terminals of adjacent capacitors C1.

The interconnection IL4 is connected to the input node of the inverting amplifier 52N. The output node of the inverting amplifier 52N is connected to the gate of the transistor M5 via the switch S5. The switch S3 is connected between the input node and the output node of the inverting amplifier 52N. A current source MN is connected between the power supply voltage node (voltage VDD) and the drain of the transistor M5. The source of the transistor M5 is connected to the ground node (GND). A connection node between the current source MN and the drain of the transistor M5 is connected to a connection node between the switch $S1_N$ and the capacitor $C1_N$ of the unit capacitor portion $50N_N$ via the switch S4. A connection node between the current source 54N and the drain of the transistor M5 is connected to the interconnection IL1.

The amplifier unit 48N is an amplifier circuit in which an inverting amplifier 52N and a source follower circuit including the current source 54N and the transistor M5 are cascade-connected. The amplifier unit 48N may output a current corresponding to the voltage held in the capacitors $C1_1$ to $C1_N$ to the interconnection IL1.

Figure 6:
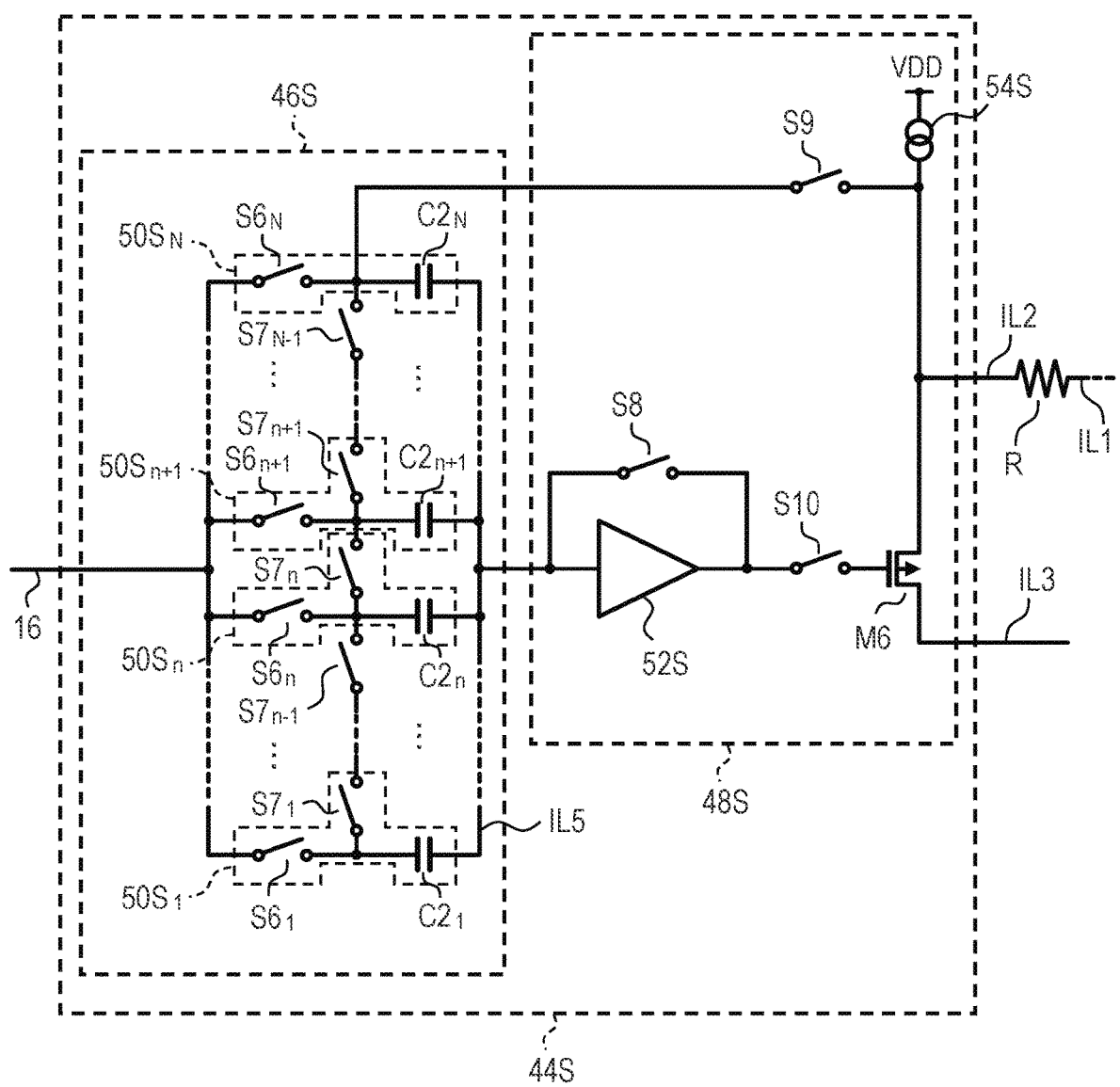
FIG. 6 is a circuit diagram illustrating a configuration example of an S-signal sample-and-hold circuit in the photoelectric conversion device according to the first embodiment of the disclosure.

FIG. 6 is a circuit diagram illustrating a configuration example of the S-signal sample-and-hold circuit 44S. As illustrated in FIG. 6, the S-signal sample-and-hold circuit 44S includes a capacitor unit 46S and an amplifier unit 48S.

The capacitor unit 46S includes a plurality of (N) unit capacitor portions $50S_1, \ldots, 50S_n, 50S_{n+1}, \ldots, 50S_N$ (N is an integer of 2 or more, and n is an integer of 1 or more and less than N). Each of the unit capacitor portions $50S_1$ to $50S_{N-1}$ includes a switch S6, a switch S7, and a capacitor C2. The unit capacitor portion $50S_N$ includes a switch S6 and a capacitor C2. In FIG. 6, in order to indicate the unit capacitor portion 50S to which the switch S6, the switch S7, and the capacitor C2 belong, these reference numerals are given the same consecutive numbers as the unit capacitor portion 50S. For example, the constituent elements of the unit capacitor portion $50S_1$ are represented by a switch $S6_1$, a switch $S7_1$, and a capacitor $C2_1$.

The amplifier unit 48S includes an inverting amplifier 52S, a current source 54S, a transistor M6, and switches S8, S9, and S10. The transistor M6 is a p-channel transistor. The switches $S6_1$ to $S6_N$, the switches $S7_1$ to $S7_{N-1}$, the switch S8, the switch S9, and the switch S10 are controlled to be turned on or off in accordance with a control signal supplied from the control unit 90.

In each of the unit capacitor portions $50S_1$ to $50S_N$, one terminal of the switch S6 is connected to the output line 16.

The other terminal of the switch S6 is connected to one terminal of the capacitor C2. The other terminal of the capacitor C2 is connected to the interconnection IL5. That is, one terminal of the switch S6 of the unit capacitor portions $50S_1$ to $50S_N$ is commonly connected to the output line 16, and the other terminal of the capacitor C2 of the unit capacitor portions $50S_1$ to $50S_N$ is commonly connected to the interconnection IL5. In other words, the unit capacitor portions $50S_1$ to $50S_N$ are connected in parallel between the output line 16 and the interconnection IL5. The interconnection IL5 connects the unit capacitor portions $50S_1$ to $50S_N$ and the amplifier unit 48S.

The switches S2 of the unit capacitor portions $50S_1$ to $50S_{N-1}$ are connected between the connection nodes of the switches S6 of adjacent unit capacitor portions 50S and the capacitor C2. That is, assuming that n is an integer of 1 to N-1, a connection node between the switch $S6_n$ and the capacitor $C2_n$ of the unit capacitor portion $50S_n$ is connected to a connection node between the switch $S6_{n+1}$ and the capacitor $C2_{n+1}$ of the unit capacitor portion $50S_{n+1}$ via the switch $S7_n$.

The capacitor C2 is a unit capacitor serving as a structural unit of a sampling capacitor constituting the S-signal sample-and-hold circuit 44S. The plurality of switches S6 and the plurality of switches S7 constituting the capacitor unit 46S constitute a switch circuit for constituting a sampling capacitor by combining the plurality of capacitors C2. The plurality of switches S6 has a function of selectively switching a connection state between the output line 16 and the plurality of capacitors C2. The plurality of switches S7 has a function of selectively switching a connection state between one terminals of adjacent capacitors C2.

The interconnection IL5 is connected to the input node of the inverting amplifier 52S. The output node of the inverting amplifier 52S is connected to the gate of the transistor M6 via the switch S10. The switch S8 is connected between the input node and the output node of the inverting amplifier 52S. A current source 54S is connected between the power supply voltage node (voltage VDD) and the drain of the transistor M6. The source of the transistor M6 is connected to the interconnection IL3. A connection node between the current source 54S and the drain of the transistor M6 is connected to a connection node between the switch $S6_N$ and the capacitor $C2_N$ of the unit capacitor portion $50S_N$ via the switch S9. A connection node between the current source 54S and the drain of the transistor M6 is connected to the interconnection IL2.

The amplifier unit 48S is an amplifier circuit in which an inverting amplifier 52S and a source follower circuit including the current source 54S and the transistor M6 are cascade-connected. The amplifier unit 48S may output a current corresponding to the difference between the current corresponding to the voltage held in the capacitors $C2_1$ to $C2_N$ and the current input from the interconnection IL2 to the interconnection IL3.

An outline of the operation of the sample-and-hold unit 40 will be described with reference to FIG. 3 to FIG. 6. During the output period of the reset signal from time T2 to time T3 in FIG. 3, the switches $S1_1$ to $S1_N$, S3, $S6_{n+1}$ to $S6_N$, and S8 are turned on. During this period, the other switches are off. Thereafter, the switches $S1_1$ to $S1_N$, S3, $S6_{n+1}$ to $S6_N$, and S8 are turned off. By these operations, the voltages based on the reset signals are held in the capacitors $C1_1$ to $C1_N$ and $C2_{n+1}$ to $C2_N$.

Thereafter, during the output period of the photoelectric conversion signal from time T3 to time T4 in FIG. 3, the switches $S2_1$ to $S2_{N-1}$, S4, S5, $S6_1$ to $S6_n$, and S8 are turned on. During this period, the other switches are off. By this operation, the capacitors $C1_1$ to $C1_N$ are connected in parallel, and the N-signal sample-and-hold circuit 44N outputs a current corresponding to the voltage held in the capacitors $C1_1$ to $C1_N$ to the interconnection IL1. After that, the switches $S6_1$ to $S6_n$ and S8 are turned off. By these operations, the voltages based on the photoelectric conversion signals are held in the capacitors $C2_1$ to $C2_n$.

Thereafter, the switches $S2_1$ to $S2_{N-1}$, S4, S5, $S7_1$ to $S7_{N-1}$, S9, and S10 are turned on. The other switches are off. By this operation, the capacitors $C2_1$ to $C2_N$ are connected in parallel, and the S-signal sample-and-hold circuit 44S outputs a current corresponding to the difference between the current corresponding to the voltage held in the capacitors $C2_1$ to $C2_N$ and the current input from the interconnection IL2 to the interconnection IL3.

By the above operation, the current signal subjected to the correction processing by the correlated double sampling of the photoelectric conversion signal and the reset signal may be output to the interconnection IL3. In the capacitor unit 46S, the photoelectric conversion signals held in the n-number of capacitors $C2_1$ to $C2_n$ and the reset signals held in the (N−n)-number of capacitors $C2_{n+1}$ to $C2_N$ are weighted and averaged according to the number of capacitors. Thus, the voltage of the difference between the reset signal and the photoelectric conversion signal is attenuated by n/N times. Therefore, the voltage range of the input signal in the column circuit may be extended.

Figure 7:
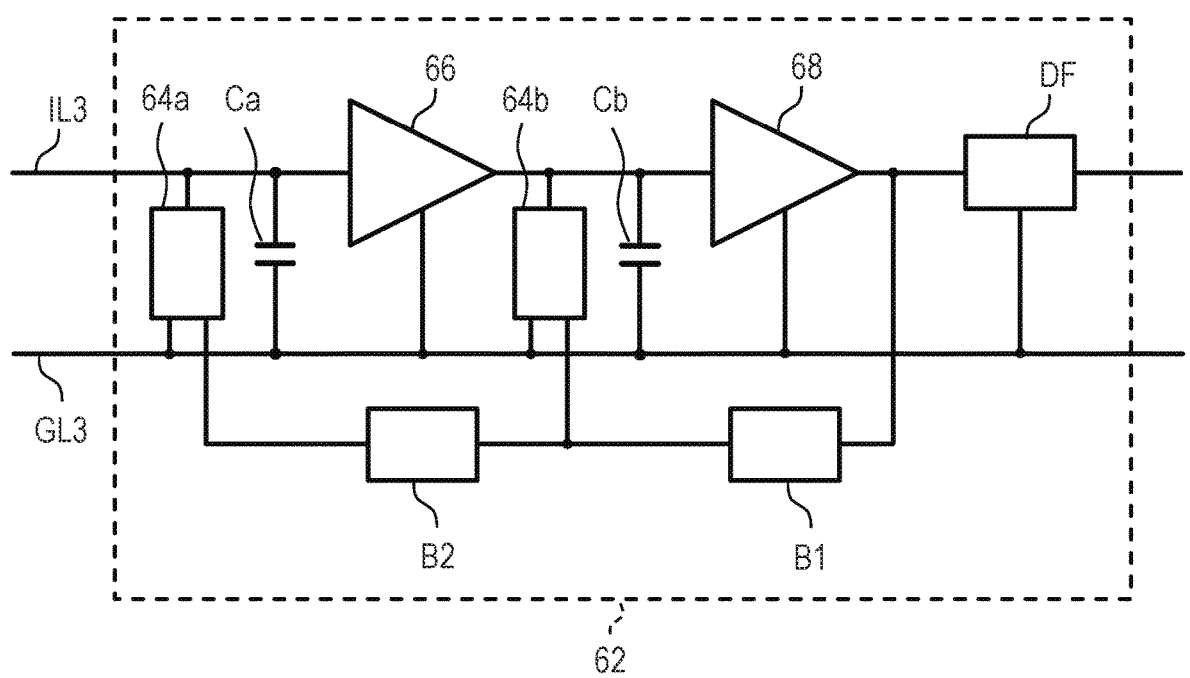
FIG. 7 is a block diagram illustrating a configuration example of a column AD conversion unit in the photoelectric conversion device according to the first embodiment of the disclosure.

FIG. 7 is a block diagram illustrating a configuration example of the column AD conversion unit 62 in the photoelectric conversion device according to the present embodiment. Although the column AD conversion unit 62 illustrated in the present embodiment is a delta-sigma type AD conversion circuit, the disclosure is not limited thereto. For example, the column AD conversion unit 62 may be an AD conversion circuit of a system in which the ramp signal and the input voltage are compared and the time until the magnitude relation is inverted is measured by a counter. The column AD conversion unit 62 may be a successive approximation type AD conversion circuit that obtains a digital value close to the input voltage by repeatedly comparing the output voltage of the DA converter circuit and the input voltage. Although a 1-bit AD conversion circuit is exemplified in the present embodiment, AD conversion of a larger number of bits may be actually performed.

As illustrated in FIG. 7, the column AD conversion unit 62 includes digital-to-analog conversion circuits (DA conversion circuits) 64a and 64b, capacitors Ca and Cb, a voltage-to-current conversion unit 66, a quantizer 68, a decimation filter DF, and buffers B1 and B2. As described above, the column AD conversion unit 62 receives the current signal processed by the correlated double sampling from the column sample-and-hold unit 42 via the interconnection IL3.

The interconnection IL3 is connected to the output terminal of the DA conversion circuit 64a, the first terminal of the capacitor Ca, and the input terminal of the voltage-current conversion unit 66. The output terminal of the voltage-current conversion unit 66 is connected to the output terminal of the DA conversion circuit 64b, the first terminal of the capacitor Cb, and the input terminal of the quantizer 68. An output terminal of the quantizer 68 is connected to an input terminal of the decimation filter DF and an input terminal of the buffer B1. The output terminal of the buffer B1 is connected to the input terminal of the DA conversion circuit 64b and the input terminal of the buffer B2. An output terminal of the buffer B2 is connected to an input terminal of the DA conversion circuit 64a. The ground terminals of the DA conversion circuits 64a and 64b, the second terminals of the capacitors Ca and Cb, the ground terminal of the voltage-current conversion unit 66, the ground terminal of the quantizer 68, and the ground terminal of the decimation filter DF are connected to the ground line GL3. An output terminal of the decimation filter DF is an output terminal of the column AD conversion unit 62.

Charge is accumulated in the capacitor Ca in accordance with the amount of current flowing through the interconnection IL3 and the passage of time. The voltage-current conversion unit 66 outputs a current signal corresponding to the potential of the first terminal of the capacitor Ca from the output terminal. Thus, the capacitor Ca functions as an integrator.

Charge is accumulated in the capacitor Cb in accordance with the amount of current output from the voltage-current conversion unit 66 and the passage of time. Thus, the capacitor Cb and the voltage-current conversion unit 66 function as an integrator. The quantizer 68 may be a comparison circuit. The quantizer 68 compares the potential of the first terminal of the capacitor Cb with a threshold value, and outputs a comparison result. Thus, the quantizer 68 performs 1-bit analog-to-digital conversion. The quantizer 68 performs oversampling at a frequency higher than a desired sampling frequency.

The digital signal output from the quantizer 68 is input to the buffer B1. The digital signal is fed back to the DA conversion circuits 64a and 64b via the buffers B1 and B2. The DA conversion circuits 64a and 64b include a current source, a switch, and the like. The DA conversion circuit 64a performs digital-to-analog conversion in which a current corresponding to the input digital signal flows, thereby extracting charge corresponding to the digital signal from the first terminal of the capacitor Ca and flowing the charge to the ground line GL3. Similarly, the DA conversion circuit 64b extracts an amount of charge corresponding to the input digital signal from the first terminal of the capacitor Cb and flows the charge to the ground line GL3. In this way, the digital signal output from the quantizer 68 is fed back to the input side of the integrator or the quantizer 68. This feedback loop operates to reduce quantization errors in the low frequency domain.

As illustrated in FIG. 7, the column AD conversion unit 62 of the present embodiment tends to be arranged extending in one direction, so that the feedback interconnection may be long. The buffers B1 and B2 reduce the influence of a voltage drop or the like caused by a long feedback interconnection. However, the buffers B1 and B2 may not be provided when the influence of the interconnection for feedback is acceptable.

The decimation filter DF performs a process of decreasing the sampling frequency by thinning out the signal output from the quantizer 68. Thus, noise in the high frequency region is removed.

As described above, the column AD conversion unit 62 of the present embodiment employs a delta-sigma type suitable for high accuracy and high resolution. Thus, a high-accuracy digital signal may be output.

When attention is paid to the accuracy of the correction process by the correlated double sampling of the photoelectric conversion signal and the reset signal, in one embodiment, the circuit characteristics of the N-signal sample-and-hold circuit 44N and the circuit characteristics of the S-signal sample-and-hold circuit 44S are made as close to each other as possible. Therefore, the N-signal sample-and-hold circuit 44N and the S-signal sample-and-hold circuit 44S have the same configuration. The same configuration may include the same circuit configuration and the same structure and arrangement of elements. The same circuit configuration may include the same number of unit capacitor portions 50N (capacitors C1) and the same number of unit capacitor portions 50S (capacitors C2).

Figure 8:
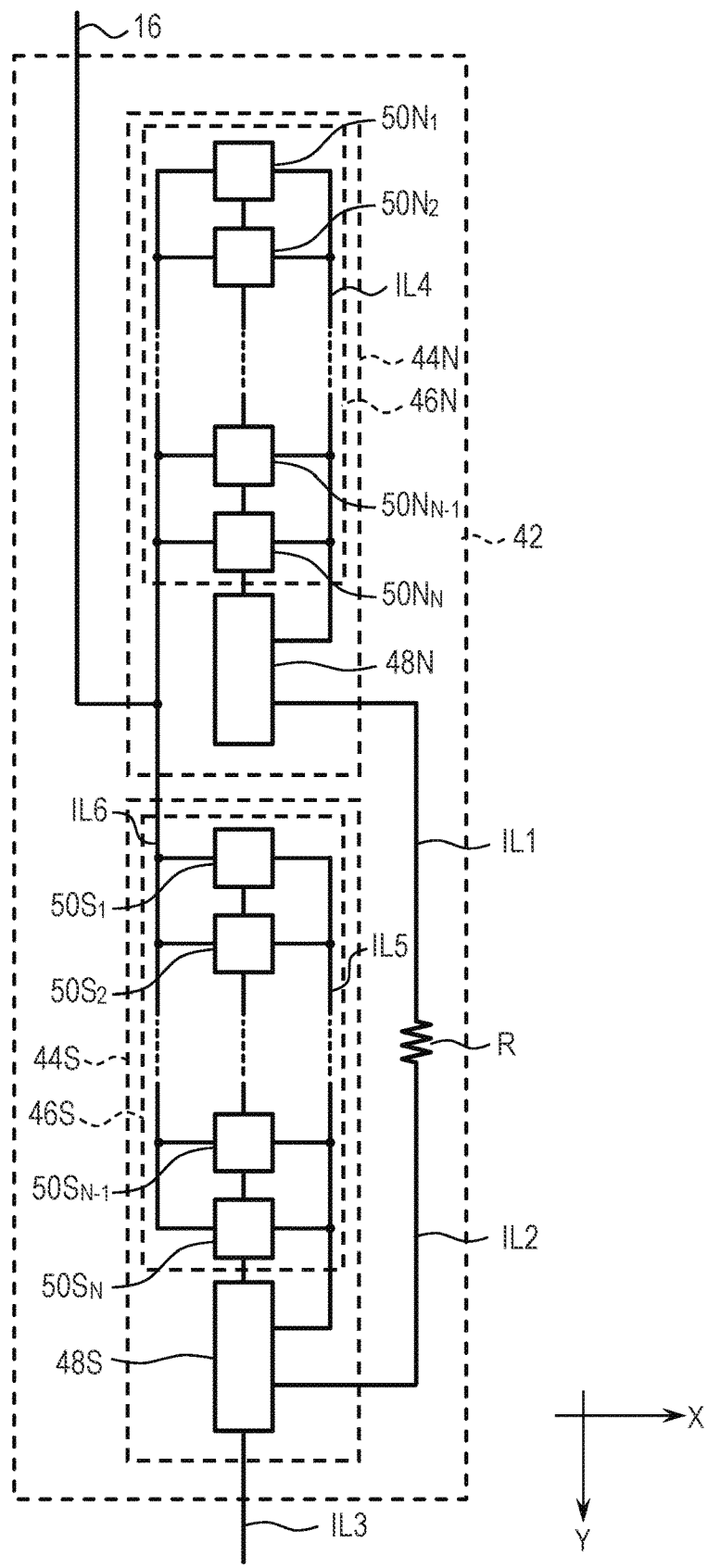
FIG. 8 is a diagram illustrating a layout example of the arrangement of respective portions and interconnections of a column sample-and-hold unit in the photoelectric conversion device according to the first embodiment of the disclosure.

FIG. 8 is a diagram illustrating a layout example of an arrangement of respective portions and interconnections of the column sample-and-hold unit 42. In the coordinate system illustrated in FIG. 8, the X direction corresponds to the row direction (horizontal direction), and the Y direction corresponds to the column direction (vertical direction).

As illustrated in FIG. 8, the N-signal sample-and-hold circuit 44N and the S-signal sample-and-hold circuit 44S are arranged side by side along the Y direction (column direction). In the N-signal sample-and-hold circuit 44N, the capacitor unit 46N and the amplifier unit 48N are arranged side by side along the column direction. Similarly, in the S-signal sample-and-hold circuit 44N, the capacitor unit 46S and the amplifier unit 48S are arranged side by side along the column direction. When the column sample-and-hold unit 42 is viewed as a whole, the capacitor unit 46N, the amplifier unit 48N, the capacitor unit 46S, and the amplifier unit 48N are arranged in this order along the column direction. By arranging the respective circuit elements of the column sample-and-hold unit 42 in this manner, the width of the column circuit may be narrowed, and the arrangement density of the column circuits along the X direction may be increased.

Further, in the layout example of FIG. 8, the interconnection IL6 which is arranged so as to extend along the Y direction as a part of the output line 16 is provided at the connection portion between the output line 16 and the unit capacitor portions $50N_1$ to $50N_N$ and the unit capacitor portions $50S_1$ to $50S_N$. The interconnection IL6 is an interconnection for commonly connecting one electrode of the switch S1 of the unit capacitor portions $50N_1$ to $50N_N$ and the unit capacitor portions $50S_1$ to $50S_N$. That is, the output line 16 is connected to the unit capacitor portions $50N_1$ to $50N_N$ and the unit capacitor portions $50S_1$ to $50S_N$ via the interconnection IL6.

By configuring the connection portion between the output line 16 and the column sample-and-hold unit 42 in this manner, the length of the electrical path connecting the pixel 12 and the capacitor unit 46N and the length of the electrical path connecting the pixel 12 and the capacitor unit 46S may be made closer to each other. Thus, the difference between the parasitic resistance and the parasitic capacitance parasitic to the interconnection between the pixel 12 and the capacitor unit 46N and the parasitic resistance and the parasitic capacitance parasitic to the interconnection between the pixel 12 and the capacitor unit 46S may be reduced, and the accuracy of the correction process by the correlated double sampling can be improved.

Figure 9A:
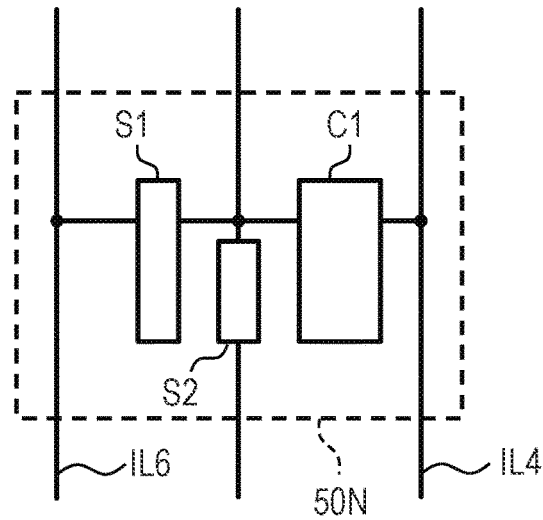
FIG. 9A, FIG. 9B, FIG. 9C, and FIG. 9D are diagrams illustrating layout examples of respective portions of the unit capacitor portion in the photoelectric conversion device according to the first embodiment of the disclosure.
Figure 9B:
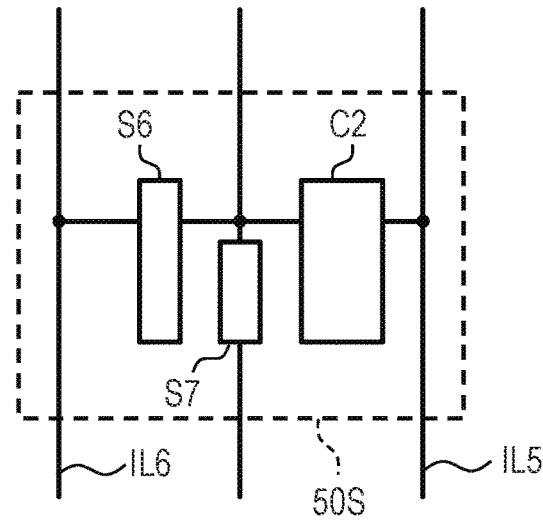
Figure 9C:
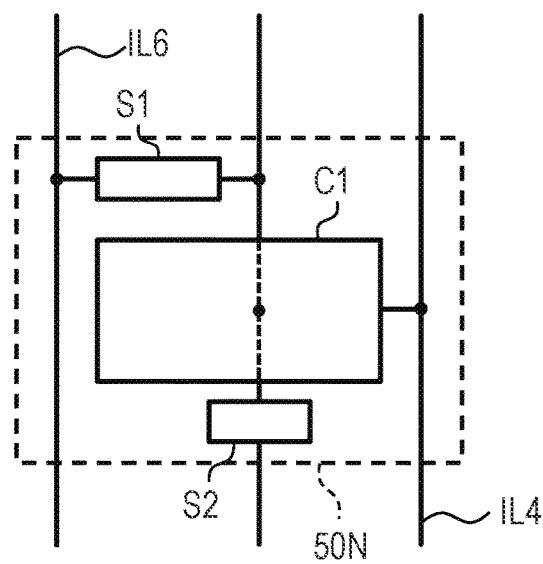
Figure 9D:
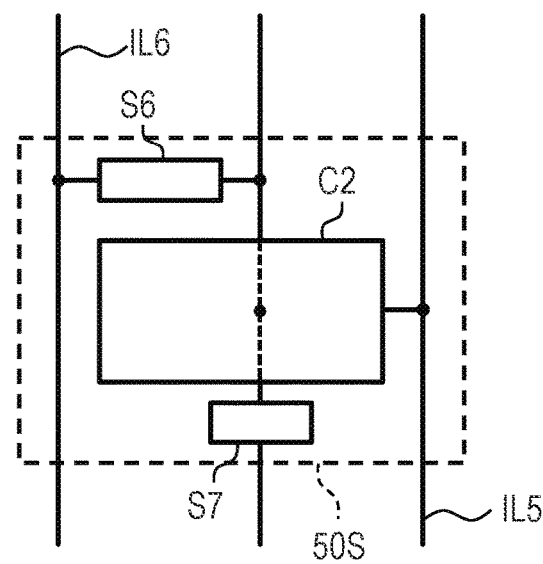

FIG. 9A to FIG. 9D are diagrams illustrating a layout example of the arrangement of the switches S1 and S2 and the capacitor C1 in the unit capacitor portion 50N and a layout example of the arrangement of the switches S6 and S7 and the capacitor C2 in the unit capacitor portion 50S. FIG. 9A and FIG. 9C illustrate layouts of the arrangement of the switches S1 and S2 and the capacitor C1 in the unit capacitor portion 50N, and FIG. 9B and FIG. 9D illustrate layouts of the arrangement of the switches S6, S7 and the capacitor C2 in the unit capacitor portion 50S. In the coordinate system illustrated in FIG. 9A to FIG. 9D, the X direction corresponds to the row direction (horizontal direction), and the Y direction corresponds to the column direction (vertical direction).

The switches S1 and S2 and the capacitor C1 of the unit capacitor portion 50N may be arranged side by side in the X direction, for example, as illustrated in FIG. 9A. In this case, for example, as illustrated in FIG. 9B, the switches S6 and S7 and the capacitor C2 of the unit capacitor portion 50S are arranged side by side in the X direction, like the switches S1 and S2 and the capacitor C1 of the unit capacitor portion 50N. Alternatively, the switches S1 and S2 and the capacitor C1 of the unit capacitor portion 50N may be arranged side by side in the Y direction as illustrated in FIG. 9C, for example. In this case, for example, as illustrated in FIG. 9D, the switches S6 and S7 and the capacitor C2 of the unit capacitor portion 50S are arranged side by side in the Y direction, similarly to the switches S1 and S2 and the capacitor C1 of the unit capacitor portion 50N.

The layout of two switches and one capacitor constituting the unit capacitor portions 50N and 50S is not limited to these, but the layout of the unit capacitor portion 50N and the layout of the unit capacitor portion 50S are the same. Such a configuration may reduce variations in element size or the like caused by a difference in layout. Thus, variation in characteristics between the capacitor unit 46N and the capacitor unit 46S may be reduced, and accuracy of correction processing by correlated double sampling may be improved.

Figure 10:
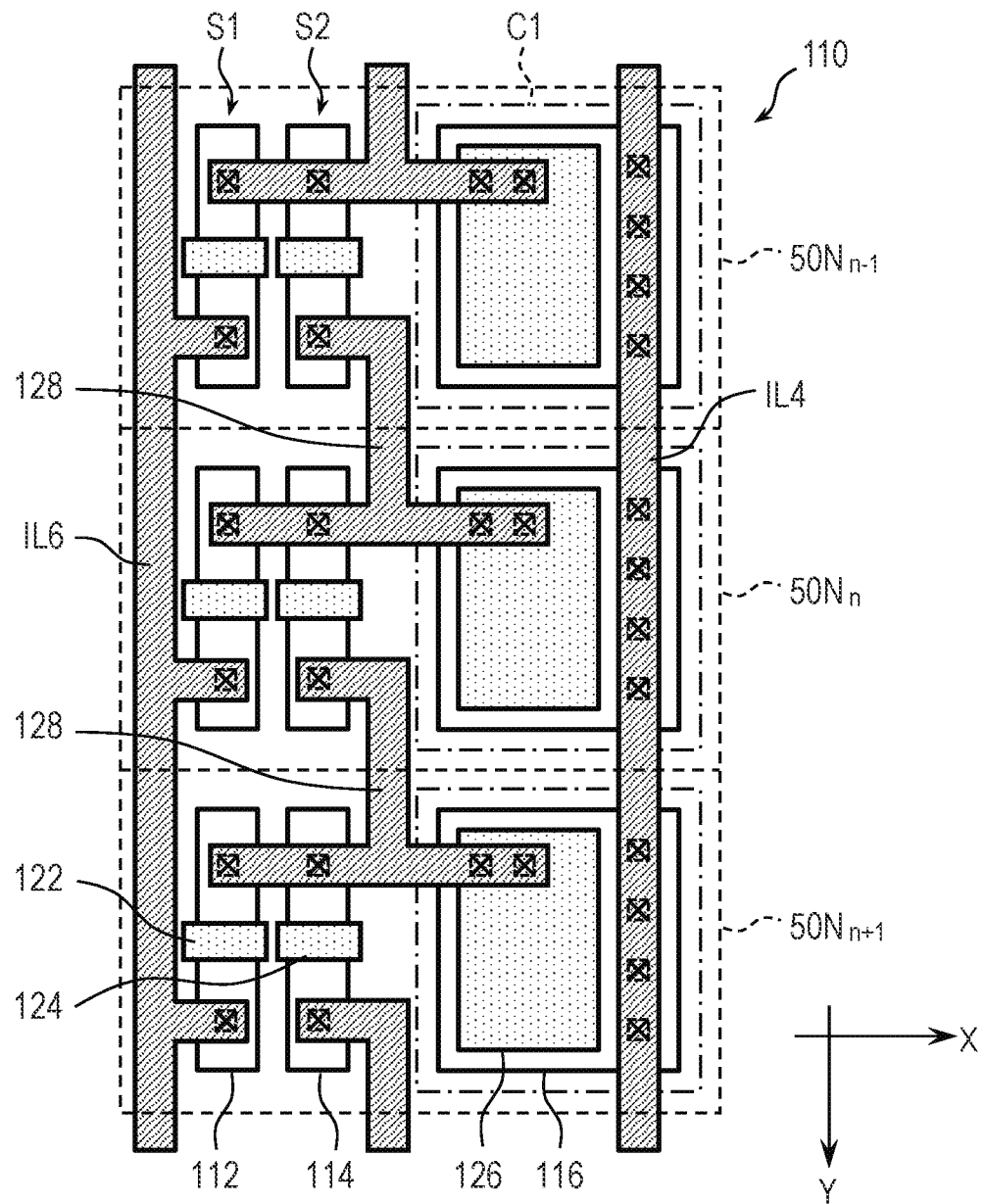
FIG. 10 and FIG. 11 are plan views illustrating layout examples of capacitor portions in the photoelectric conversion device according to the first embodiment of the disclosure.

FIG. 10 illustrates a specific planar layout example on the semiconductor substrate when the switches S1 and S2 and the capacitor C1 of the unit capacitor portion 50N are arranged side by side in the X direction. FIG. 10 illustrates three unit capacitor portions $50N_{n-1}$ to $50N_{n+1}$ arranged in the Y direction. Although the unit capacitor portion 50N will be described here as an example, the same applies to the case where the switches S6 and S7 and the capacitor C2 of the unit capacitor portion 50S are arranged side by side in the X direction.

For simplicity, FIG. 10 illustrates only a pattern of an active region defined in a semiconductor substrate, a pattern of a gate layer constituting gate electrodes of transistors and electrodes of capacitors, and a first-level metal interconnection layer. Rectangular regions marked with x indicate a contact portion connecting the first-level metal interconnection layer and the active region or the capacitor electrode.

An active region 112 in which a transistor constituting the switch S1 is provided, an active region 114 in which a transistor constituting the switch S2 is provided, and an active region 116 in which the capacitor C1 is provided are defined in the semiconductor substrate 110. The active regions 112, 114, 116 are arranged side by side along the X direction.

A gate electrode 122 of the transistor constituting the switch S1 is provided over the active region 112 with a gate insulating film (not illustrated) interposed therebetween. A gate electrode 124 of the transistor constituting the switch S2 is provided over the active region 114 with a gate insulating film (not illustrated) interposed therebetween. The gate electrodes 122 and 124 are arranged to extend along the X direction. A capacitor electrode 126 is provided over the active region 116 with a capacitor insulating film (not illustrated) interposed therebetween.

An interconnection IL6 is connected to one main node (source or drain) of the transistor constituting the switch S1. The other main node (drain or source) of the transistor constituting the switch S1 is connected to one main node (source or drain) of the transistor constituting the switch S2 and the capacitor electrode 126 via an interconnection 128. The interconnection 128 is also connected to the other main node (drain or source) of the transistor constituting the switch S2 of the adjacent unit capacitor portions 50N. The interconnection IL4 is connected to the active region 116 constituting the lower electrode of the capacitor C1.

The switch S1, the switch S2, and the capacitor C1 of the unit capacitor portions $50N_{n-1}$ to $50N_{n+1}$ are arranged so as to be aligned along the Y direction. The interconnection IL6 is arranged so as to extend along the Y direction, and is commonly connected to one main node of the transistors constituting the switch S1 of each of the unit capacitor portions $50N_{n-1}$ to $50N_{n+1}$. The interconnection IL4 is arranged so as to extend along the Y direction, and is commonly connected to the lower electrode (active region 116) of the capacitor C1 of each of the unit capacitor portions $50N_{n-1}$ to $50N_{n+1}$.

Although not illustrated, the switches S6, S7, and C2 of the unit capacitor portions $50N_{n-1}$ to $50N_{n+1}$ are also arranged so as to be aligned along the Y direction. The interconnection IL6 is arranged so as to extend along the Y direction, and is commonly connected to one main node of the transistors constituting the switch S6 of the unit capacitor portions $50N_{n-1}$ to $50N_{n+1}$. The interconnection IL5 is arranged so as to extend along the Y direction, and is commonly connected to the lower electrode (active region 116) of the capacitor C2 of the unit capacitor portions $50N_{n-1}$ to $50N_{n+1}$.

The switches S1 of the unit capacitor portions $50N_{n-1}$ to $50N_{n+1}$ and the switches S6 of the unit capacitor portions $50N_{n-1}$ to $50N_{n+1}$ are arranged so as to be aligned along the Y direction. The switches S2 of the unit capacitor portions $50N_{n-1}$ to $50N_{n+1}$ and the switches S7 of the unit capacitor portions $50N_{n-1}$ to $50N_{n+1}$ are arranged so as to be aligned along the Y direction. The capacitors C1 of the unit capacitor portions $50N_{n-1}$ to $50N_{n+1}$ and the capacitors C2 of the unit capacitor portions $50N_{n-1}$ to $50N_{n+1}$ are arranged so as to be aligned along the Y direction.

Figure 11:
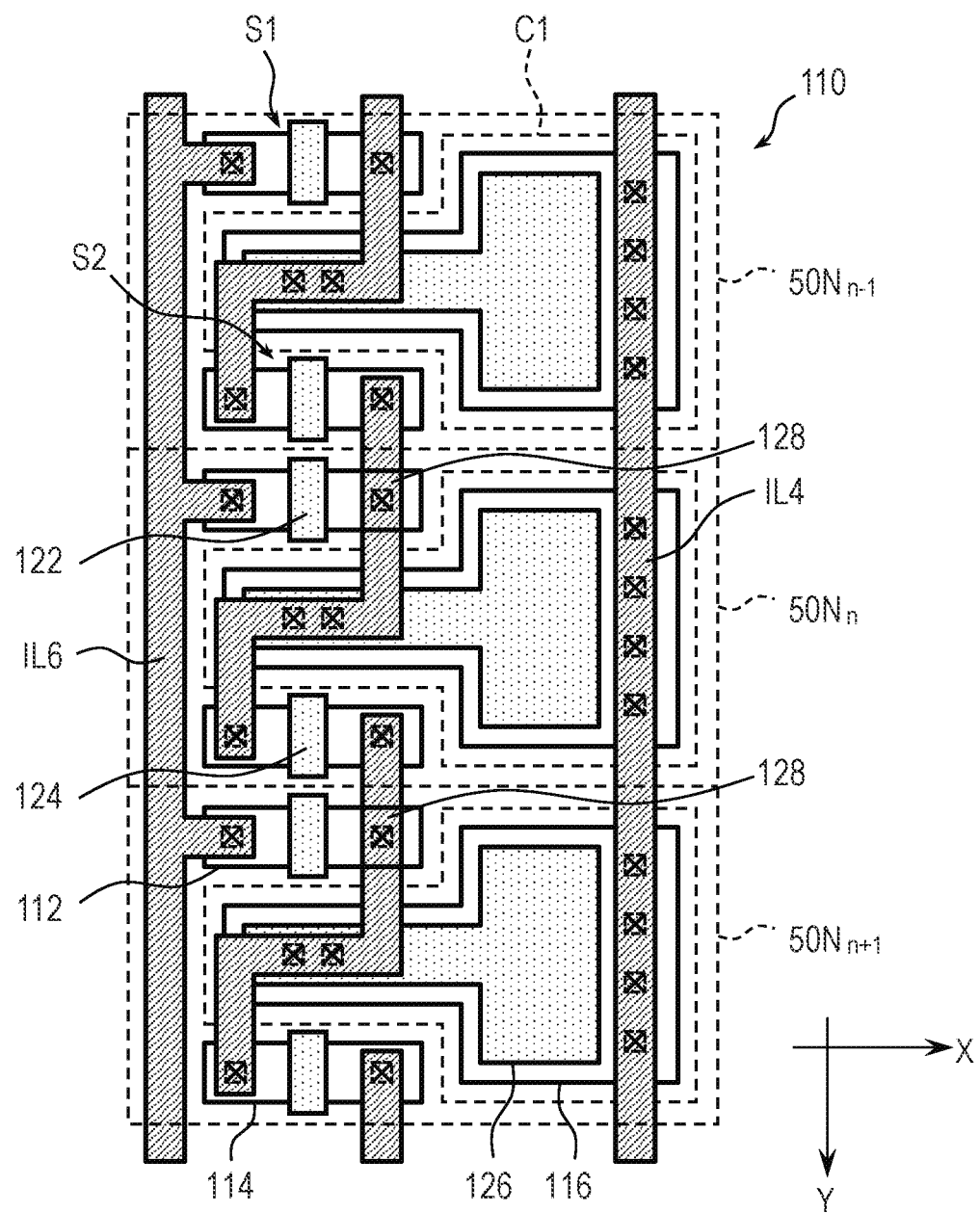

FIG. 11 illustrates a specific planar layout example on the semiconductor substrate when the switches S1 and S2 and the capacitor C1 of the unit capacitor portion 50N are arranged side by side in the Y direction. FIG. 11 illustrates three unit capacitor portions $50N_{n-1}$ to $50N_{n+1}$ arranged in the Y direction. Although the unit capacitor portion 50N will be described here as an example, the same applies to the case where the switches S6 and S7 and the capacitor C2 of the unit capacitor portion 50S are arranged side by side in the Y direction.

For simplicity, FIG. 11 illustrates only a pattern of an active region defined in a semiconductor substrate, a pattern of a gate layer constituting gate electrodes of transistors and electrodes of capacitors, and a first-level metal interconnection layer. Rectangular regions marked with x indicate a contact portion connecting the first-level metal interconnection layer and the active region or the capacitor electrode.

An active region 112 in which a transistor constituting the switch S1 is provided, an active region 114 in which a transistor constituting the switch S2 is provided, and an active region 116 in which the capacitor C2 is provided are defined in the semiconductor substrate 110. The active regions 112, 116, 114 are arranged side by side along the Y direction.

A gate electrode 122 of the transistor constituting the switch S1 is provided over the active region 112 with a gate insulating film (not illustrated) interposed therebetween. A gate electrode 124 of the transistor constituting the switch S2 is provided over the active region 114 with a gate insulating film (not illustrated) interposed therebetween. The gate electrodes 122 and 124 are arranged to extend along the Y direction. A capacitor electrode 126 is provided over the active region 116 with a capacitor insulating film (not illustrated) interposed therebetween.

An interconnection IL6 is connected to one main node (source or drain) of the transistor constituting the switch S1. The other main node (drain or source) of the transistor constituting the switch S1 is connected to one main node (source or drain) of the transistor constituting the switch S2 and the capacitor electrode 126 via the interconnection 128. The interconnection 128 is also connected to the other main node (drain or source) of the transistor constituting the switch S2 of the adjacent unit capacitor portions 50N. The interconnection IL4 is connected to the active region 116 constituting the lower electrode of the capacitor C1.

As illustrated in FIG. 10 and FIG. 11, each of the switch S1, the switch S2, and the capacitor C1 of the unit capacitor portions $50N_{n-1}$ to $50N_{n+1}$ is arranged so as to be aligned along the Y direction. The interconnection IL6 is arranged so as to extend along the Y direction, and is commonly connected to one main node of the transistor constituting the switch S1 of each of the unit capacitor portions $50N_{n-1}$ to $50N_{+1}$. The interconnection IL4 is arranged so as to extend along the Y direction, and is commonly connected to the lower electrode (active region 116) of the capacitor C1 of each of the unit capacitor portions $50N_{n-1}$ to $50N_{n+1}$.

Although not illustrated, the switches S6, S7, and C2 of the unit capacitor portions $50S_{n-1}$ to $50S_{n+1}$ are also arranged so as to be aligned along the Y direction. The interconnection IL6 is arranged so as to extend along the Y direction, and is commonly connected to one main node of the transistors constituting the switch S6 of each of the unit capacitor portions $50S_{n-1}$ to $50S_{n+1}$. The interconnection IL5 is arranged so as to extend along the Y direction, and is commonly connected to the lower electrode (active region 116) of the capacitor C2 of each of the unit capacitor portions $50S_{n-1}$ to $50S_{n+1}$.

That is, the switches S1 of the unit capacitor portions $50N_{n-1}$ to $50N_{n+1}$ and the switches S6 of the unit capacitor portions $50S_{n-1}$ to $50S_{n+1}$ are arranged so as to be aligned along the Y direction. The switches S2 of the unit capacitor portions $50N_{n-1}$ to $50N_{n+1}$ and the switches S7 of the unit capacitor portions $50S_{n-1}$ to $50S_{n+1}$ are arranged so as to be aligned along the Y direction. The capacitors C1 of the unit capacitor portions $50N_{n-1}$ to $50N_{n+1}$ and the capacitors C2 of the unit capacitor portions $50S_{n-1}$ to $50S_{n+1}$ are arranged so as to be aligned along the Y direction.

By configuring the column sample-and-hold unit 42 in this manner, each circuit element may be efficiently arranged, and the area efficiency of the column sample-and-hold unit 42 may be improved.

As described above, according to the present embodiment, it is possible to reduce variation in characteristics between the elements constituting the N-signal sample-and-hold circuit 44N and the elements constituting the S-signal sample-and-hold circuit 44S, and to improve the accuracy of correction processing by correlated double sampling.

Second Embodiment

A photoelectric conversion device according to a second embodiment of the disclosure will be described with reference to FIG. 12. The same components as those of the photoelectric conversion device according to the first embodiment are denoted by the same reference numerals, and the description thereof will be omitted or simplified.

Figure 12:
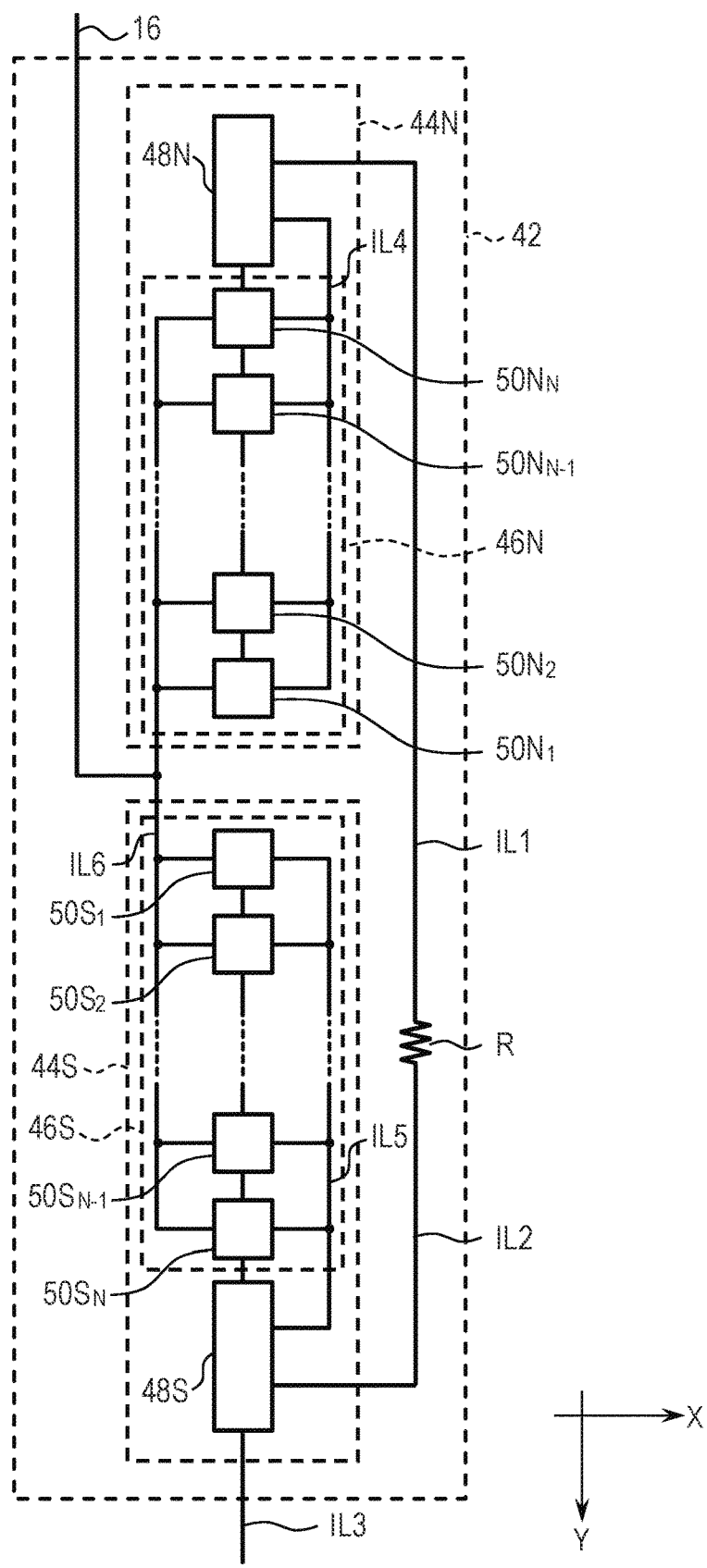
FIG. 12 is a diagram illustrating a layout example of the arrangement of respective portions of a column sample-and-hold unit in a photoelectric conversion device according to a second embodiment of the disclosure.

FIG. 12 is a diagram illustrating a layout example of the arrangement of a column sample-and-hold unit in the photoelectric conversion device according to the present embodiment.

The photoelectric conversion device according to the present embodiment is the same as the photoelectric conversion device according to the first embodiment except that the layout of the respective portions of the column sample-and-hold unit 42 is different. That is, in the photoelectric conversion device according to the first embodiment, the capacitor unit 46N, the amplifier unit 48N, the capacitor unit 46S, and the amplifier unit 48S are arranged in this order along the column direction. In contrast, in the photoelectric conversion device according to the present embodiment, as illustrated in FIG. 12, the amplifier unit 48N, the capacitor unit 46N, the capacitor unit 46S, and the amplifier unit 48S are arranged in this order along the column direction.

By arranging the capacitor units 46N and 46S and the amplifier units 48N and 48S in this way, the capacitor unit 46N and the capacitor unit 46S may be arranged adjacent to each other. Here, that the capacitor unit 46N and the capacitor unit 46S are adjacent to each other means that other circuit elements (for example, the amplifier units 48N and 48S) are not disposed between the capacitor unit 46N and the capacitor unit 46S. This makes it possible to reduce variations in characteristics between the capacitor unit 46N and the capacitor unit 46S caused by in-plane variations in element size, layout, and the like in manufacturing. Further, when disturbance such as crosstalk or heat generation is received, the influence thereof is equally affected by the capacitor units 46N and 46S, so that variation in characteristic variation between the capacitor unit 46N and the capacitor unit 46S caused by the disturbance may be reduced. Thus, the accuracy of the correction process by the correlated double sampling may be improved.

The capacitor unit 46N and the amplifier unit 48N, and the capacitor unit 46S and the amplifier unit 48S are arranged symmetrically with respect to the center line between the capacitor unit 46N and the capacitor unit 46S. Therefore, the structural symmetry of each circuit element with respect to the center line may be further enhanced. Thus, the difference between the parasitic resistance and the parasitic capacitance of the interconnection connecting the pixel 12 and the capacitor unit 46N and the parasitic resistance and the parasitic capacitance of the interconnection connecting the pixel 12 and the capacitor unit 46S may be reduced, and the accuracy of the correction process by the correlated double sampling may be further improved.

Therefore, according to the above configuration of the present embodiment, variation in characteristics between the elements constituting the N-signal sample-and-hold circuit 44N and the elements constituting the S-signal sample-and-hold circuit 44S may be reduced, and accuracy of correction processing by correlated double sampling may be improved.

Third Embodiment

Figure 13:
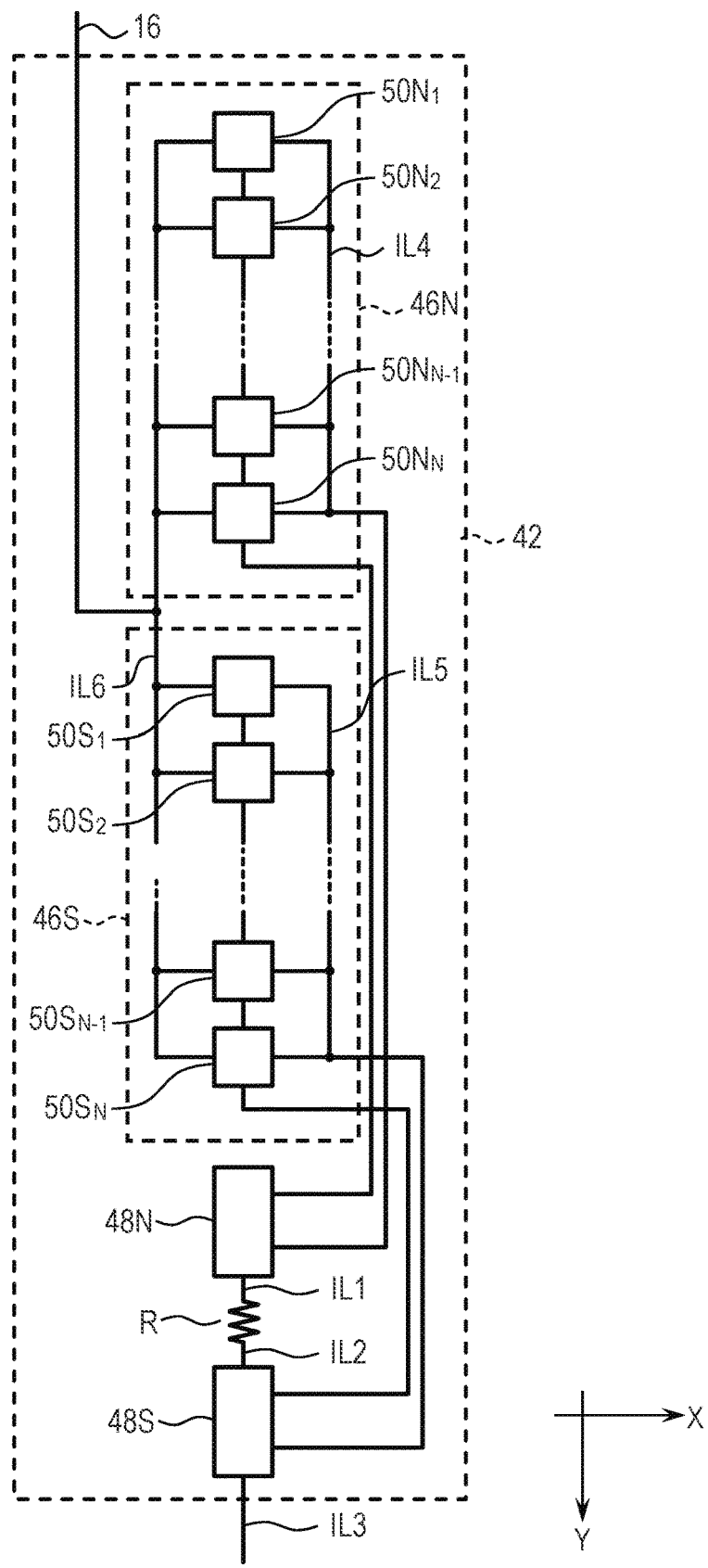
FIG. 13 is a diagram illustrating a layout example of the arrangement of respective portions of a column sample-and-hold unit in a photoelectric conversion device according to a third embodiment of the disclosure.

A photoelectric conversion device according to a third embodiment of the disclosure will be described with reference to FIG. 13. The same components as those of the photoelectric conversion device according to the first and second embodiments are denoted by the same reference numerals, and the description thereof will be omitted or simplified. FIG. 13 is a diagram illustrating a layout example of the arrangement of a column sample-and-hold unit in the photoelectric conversion device according to the present embodiment.

The photoelectric conversion device according to the present embodiment is the same as the photoelectric conversion device according to the first embodiment except that the layout of the respective portions of the column sample-and-hold unit 42 is different. That is, in the photoelectric conversion device according to the first embodiment, the capacitor unit 46N, the amplifier unit 48N, the capacitor unit 46S, and the amplifier unit 48S are arranged in this order along the column direction. In contrast, in the photoelectric conversion device according to the present embodiment, as illustrated in FIG. 13, the capacitor unit 46N, the capacitor unit 46S, the amplifier unit 48N, and the amplifier unit 48S are arranged in this order along the column direction.

By arranging the capacitor units 46N and 46S and the amplifier units 48N and 48S in this way, the capacitor unit 46N and the capacitor unit 46S may be arranged adjacent to each other. This makes it possible to reduce variations in characteristics between the capacitor unit 46N and the capacitor unit 46S caused by in-plane variations in element size, layout, and the like in manufacturing. Further, when disturbance such as crosstalk or heat generation is received, the influence thereof is equally affected by the capacitor units 46N and 46S, so that variation in characteristic variation between the capacitor unit 46N and the capacitor unit 46S caused by the disturbance may be reduced.

Similarly, the amplifier unit 48N and the amplifier unit 48S may be arranged adjacent to each other. Here, as the amplifier unit 48N and the amplifier unit 48S are adjacent to each other, other circuit elements (for example, the capacitor units 46N and 46S) are not arranged between the amplifier unit 48N and the amplifier unit 48S. This makes it possible to reduce variations in characteristics between the amplifier unit 48N and the amplifier unit 48S caused by in-plane variations in element size, layout, and the like in manufacturing. In addition, when disturbance such as crosstalk or heat generation is received, the influence thereof is equally affected by the amplifier units 48N and 48S, so that variation in characteristic variation between the amplifier unit 48N and the amplifier unit 48S caused by the disturbance can be reduced.

Further, by arranging the amplifier unit 48N and the amplifier unit 48S adjacent to each other, the interconnection IL1 connecting the amplifier unit 48N and the resistor R and the interconnection IL2 connecting the amplifier unit 48S and the resistor R are shortened, and the symmetry of the interconnection on the output side of the amplifier units 48N and 48S may be improved.

Therefore, according to the above configuration of the present embodiment, variation in characteristics between the elements constituting the N-signal sample-and-hold circuit 44N and the elements constituting the S-signal sample-and-hold circuit 44S may be reduced, and accuracy of correction processing by correlated double sampling may be improved.

In the present embodiment, the amplifier units 48N and 48S are arranged on the downstream side (lower side in FIG. 13) of the capacitor units 46N and 46S, but the amplifier units 48N and 48S may be arranged on the upstream side (upper side in FIG. 13) of the capacitor units 46N and 46S. That is, the amplifier unit 48N, the amplifier unit 48S, the capacitor unit 46N, and the capacitor unit 46S may be arranged in this order along the column direction.

Fourth Embodiment

Figure 14:
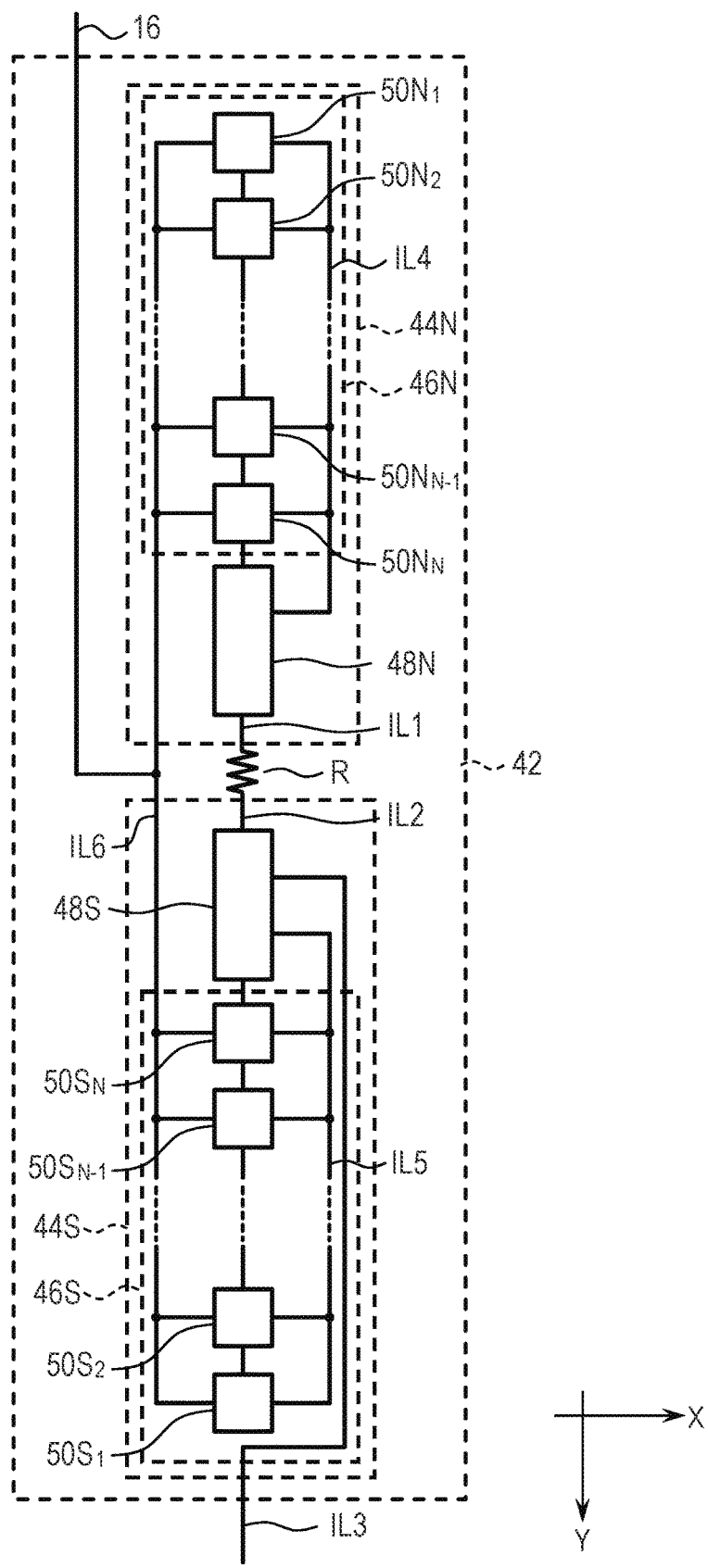
FIG. 14 is a diagram illustrating a layout example of the arrangement of respective portions of a column sample-and-hold unit in a photoelectric conversion device according to a fourth embodiment of the disclosure.

A photoelectric conversion device according to a fourth embodiment of the disclosure will be described with reference to FIG. 14. The same components as those of the photoelectric conversion device according to the first to third embodiments are denoted by the same reference numerals, and the description thereof will be omitted or simplified. FIG. 14 is a diagram illustrating a layout example of the arrangement of a column sample-and-hold unit in the photoelectric conversion device according to the present embodiment.

The photoelectric conversion device according to the present embodiment is the same as the photoelectric conversion device according to the first embodiment except that the layout of the arrangement of the respective portions of the column sample-and-hold unit 42 is different. That is, in the photoelectric conversion device according to the first embodiment, the capacitor unit 46N, the amplifier unit 48N, the capacitor unit 46S, and the amplifier unit 48S are arranged in this order along the column direction. In contrast, in the photoelectric conversion device according to the present embodiment, as illustrated in FIG. 14, the capacitor unit 46N, the amplifier unit 48N, the amplifier unit 48S, and the capacitor unit 46S are arranged in this order along the column direction.

By arranging the capacitor units 46N and 46S and the amplifier units 48N and 48S in this way, the amplifier units 48N and 48S may be arranged adjacent to each other. This makes it possible to reduce variations in characteristics between the amplifier unit 48N and the amplifier unit 48S caused by in-plane variations in element size, layout, and the like in manufacturing. In addition, when disturbance such as crosstalk or heat generation is received, the influence thereof is equally affected by the amplifier units 48N and 48S, so that variation in characteristic variation between the amplifier unit 48N and the amplifier unit 48S caused by the disturbance can be reduced.

Further, by arranging the amplifier unit 48N and the amplifier unit 48S adjacent to each other, the interconnection IL1 connecting the amplifier unit 48N and the resistor R and the interconnection IL2 connecting the amplifier unit 48S and the resistor R are shortened, and the symmetry of the interconnection on the output side of the amplifier units 48N and 48S may be improved.

Therefore, according to the above configuration of the present embodiment, variation in characteristics between the elements constituting the N-signal sample-and-hold circuit 44N and the elements constituting the S-signal sample-and-hold circuit 44S may be reduced, and accuracy of correction processing by correlated double sampling may be improved.

Fifth Embodiment

Figure 15:
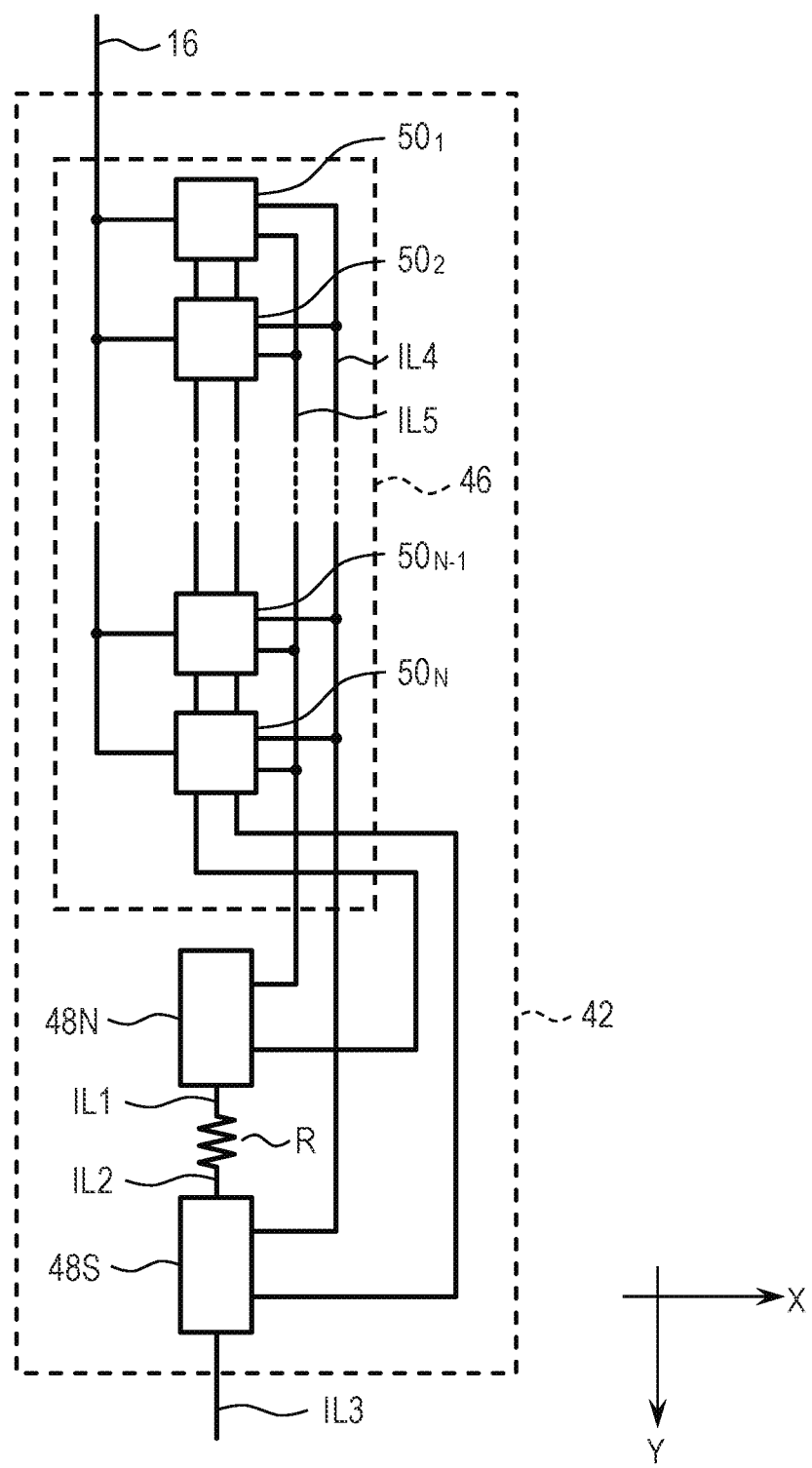
FIG. 15 is a diagram illustrating a layout example of the arrangement of respective portions of a column sample-and-hold unit in a photoelectric conversion device according to a fifth embodiment of the disclosure.
Figure 16:
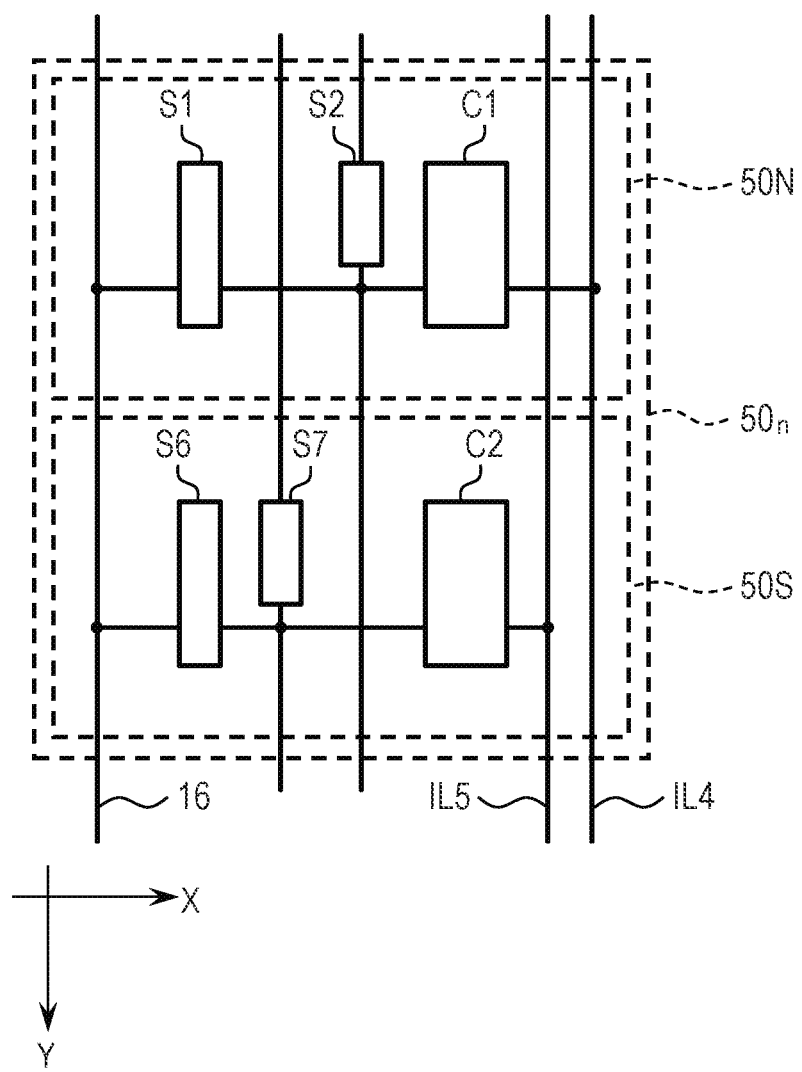
FIG. 16, FIG. 17, and FIG. 18 are diagrams illustrating layout examples of the respective portions of the unit capacitor portion in the photoelectric conversion device according to the fifth embodiment of the disclosure.
Figure 17:
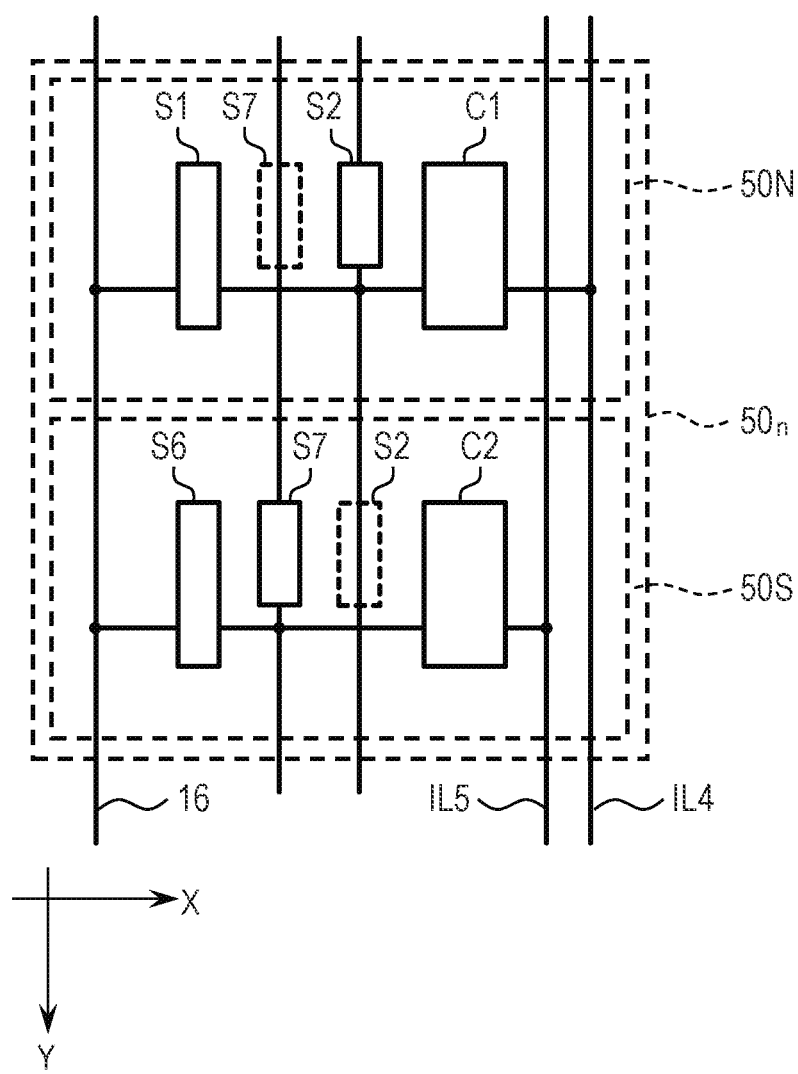
Figure 18:
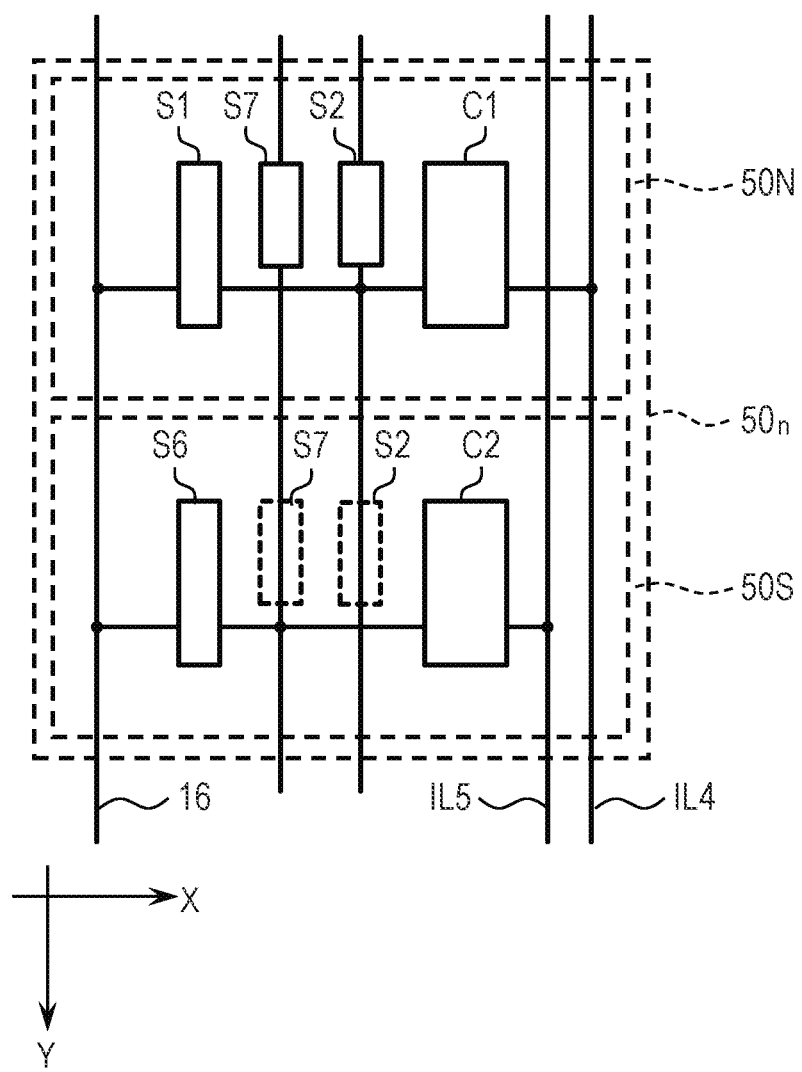

A photoelectric conversion device according to a fifth embodiment of the disclosure will be described with reference to FIG. 15 to FIG. 18. The same components as those of the photoelectric conversion devices according to the first to fourth embodiments are denoted by the same reference numerals, and the description thereof will be omitted or simplified. FIG. 15 is a diagram illustrating a layout example of the arrangement of a column sample-and-hold unit in the photoelectric conversion device according to the present embodiment. FIG. 16 to FIG. 18 are diagrams illustrating layout examples of the arrangement of the unit capacitor portions 50 in the photoelectric conversion device according to the present embodiment.

The photoelectric conversion device according to the present embodiment is the same as the photoelectric conversion device according to the first embodiment except that the layout of the respective portions of the column sample-and-hold unit 42 is different. That is, in the photoelectric conversion device according to the first embodiment, the capacitor unit 46N, the amplifier unit 48N, the capacitor unit 46S, and the amplifier unit 48S are arranged in this order along the column direction. In contrast, in the photoelectric conversion device according to the present embodiment, as illustrated in FIG. 15, the capacitor unit 46, the amplifier unit 48N, and the amplifier unit 48S are arranged in this order along the column direction.

The capacitor unit 46 includes a plurality of (N) unit capacitor portions $50_1$ to $50_N$ arranged side by side along the Y direction (column direction). As illustrated in FIG. 16, each of the plurality of unit capacitor portions $50_1$ to $50_N$ includes a unit capacitor portion 50N and a unit capacitor portion 50S. The unit capacitor portion 50N and the unit capacitor portion 50S are the same as the unit capacitor portion 50N and the unit capacitor portion 50S in the first to fourth embodiments. The switch S2 is provided between the connection nodes of the switch S1 and the capacitor C1 of the unit capacitor portions 50N adjacent to each other across the unit capacitor portion 50S. The switch S7 is provided between the connection node between the switch S6 and the capacitor C2 of the unit capacitor portions 50S adjacent to each other across the unit capacitor portion 50N. By arranging the unit capacitor portions $50_1$ to $50_N$ thus configured side by side in the column direction, the unit capacitor portions 50N and the unit capacitor portions 50S are alternately arranged adjacent to each other along the Y direction (column direction). Here, that the unit capacitor portion 50N and the unit capacitor portion 50S are adjacent to each other means that no other circuit element is arranged between the unit capacitor portion 50N and the unit capacitor portion 50S.

By configuring the capacitor unit 46 by arranging a plurality of unit capacitor portions 50 each including the unit capacitor portions 50N and 50S, the arrangement interval between the unit capacitor portion 50N and the unit capacitor portion 50S may be narrowed as compared with the case where the capacitor unit 46N and the capacitor unit 46S are separately configured. Thus, variation in characteristics (for example, capacitance error) between the unit capacitor portion 50N and the unit capacitor portion 50S caused by in-plane variation in element size, layout, and the like in manufacturing may be reduced. Further, when disturbance such as crosstalk or heat generation is received, even if the disturbance is local, the influence thereof is equally affected by the unit capacitor portions 50N and 50S, so that variation in characteristic variation between the unit capacitor portion 50N and the unit capacitor portion 50S caused by the disturbance can be reduced.

In addition, from the viewpoint of reducing variations in element size (for example, influence of microloading effect when patterning a gate layer) caused by layout, in one embodiment, the unit capacitor portion 50N and the unit capacitor portion 50S are designed in the same layout. From such a viewpoint, in one embodiment, the element constituting the switch S2 and the element constituting the switch S7 in each of the unit capacitor portion 50N and the unit capacitor portion 50S are arranged. With this configuration, the layout of the unit capacitor portion 50N and the layout of the unit capacitor portion 50S are the same, and the characteristic variation caused by the layout may be reduced.

The switches S2 and S7, which are not necessary for configuring the circuits of FIG. 5 and FIG. 6, are dummy switches, and the connection with other elements by the first-level metal interconnection layer or the like is not required. FIG. 17 illustrates an example in which the switch S7 arranged in the unit capacitor portion 50N and the switch S2 arranged in the unit capacitor portion 50S are dummy switches. FIG. 18 illustrates an example in which the switches S2 and S7 arranged in the unit capacitor portion 50S are dummy switches. In FIG. 17 and FIG. 18, dummy switches are indicated by dotted lines.

Each of the switches S2 and S7 as dummy switches may be arranged in either the unit capacitor portion 50N or the unit capacitor portion 50S, and the arrangement of the dummy switches is not limited to the examples illustrated in FIG. 17 and FIG. 18. That is, the dummy switch of the switch S2 may be arranged in the unit capacitor portion 50N, and the dummy switch of the switch S7 may be arranged in the unit capacitor portion 50S. Alternatively, the dummy switches of the switches S2 and S7 may be arranged in the unit capacitor portion 50N.

Therefore, according to the above configuration of the present embodiment, it is possible to further reduce the variation in characteristics between the elements constituting the N-signal sample-and-hold circuit 44N and the elements constituting the S-signal sample-and-hold circuit 44S, and to improve the accuracy of the correction process by the correlated double sampling.

The layout of the switches S1 and S2 and the capacitor C1 in the unit capacitor portion 50N and the layout of the switches S6 and S7 and the capacitor C2 in the unit capacitor portion 50S are not limited to the arrangement in FIG. 16. The switches S1, S2, S6, and S7 and the capacitors C1 and C2 may be arranged in the X direction as illustrated in FIG. 16, or may be arranged in the Y direction as illustrated in FIG. 9C and FIG. 9D. Alternatively, other arrangements may be used.

Although FIG. 16 illustrates the unit capacitor portion 50 including one unit capacitor portion 50N and one unit capacitor portion 50S, the unit capacitor portion 50 may include a plurality of unit capacitor portions 50N and a plurality of unit capacitor portions 50S. For example, the unit capacitor portion 50N, the unit capacitor portion 50N, the unit capacitor portion 50S, and the unit capacitor portion 50S may be arranged in this order along the column direction to form the unit capacitor portion 50, and the capacitor unit 46 in which two unit capacitor portions 50N and two unit capacitor portions 50S are alternately arranged may be formed.

Sixth Embodiment

Figure 19:
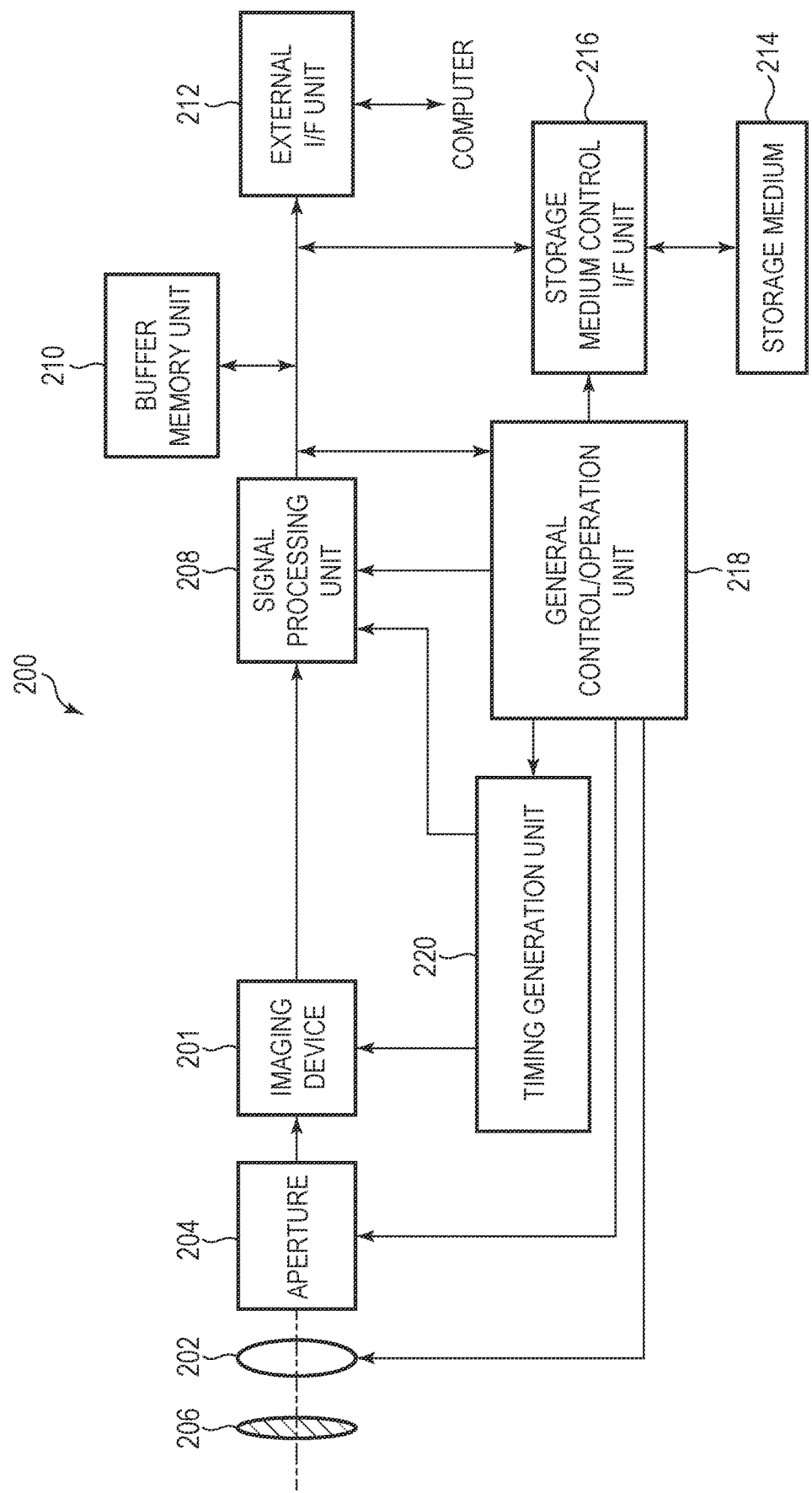
FIG. 19 is a block diagram illustrating a schematic configuration of an imaging system according to a sixth embodiment of the disclosure.

An imaging system according to a sixth embodiment of the disclosure will be described with reference to FIG. 19. FIG. 19 is a block diagram illustrating a schematic configuration of an imaging system according to the present embodiment.

The photoelectric conversion device 100 described in the first to fifth embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 19 illustrates a block diagram of a digital still camera as an example of them.

The imaging system 200 illustrated in FIG. 19 includes an imaging device 201, a lens 202 that forms an optical image of an object on the imaging device 201, an aperture 204 that varies the amount of light passing through the lens 202, and a barrier 206 for protecting the lens 202. The lens 202 and the aperture 204 are optical systems for focusing light on the imaging device 201. The imaging device 201 is the photoelectric conversion device 100 described in any of the first to fifth embodiments, and converts an optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 performs various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric converter of the imaging device 201 is formed, or may be formed on a semiconductor substrate different from the semiconductor layer on which the photoelectric converter of the imaging device 201 is formed. The signal processing unit 208 may be formed on the same semiconductor substrate as the imaging device 201.

The imaging system 200 further includes a buffer memory unit 210 that temporarily stores image data, and an external interface unit (external I/F unit) 212 that communicates with an external computer or the like. The imaging system 200 further includes a storage medium 214 such as a semiconductor memory for recording or reading out imaging data, and a storage medium control interface unit (storage medium control I/F unit) 216 for recording or reading out imaging data on or from the storage medium 214. The storage medium 214 may be built in the imaging system 200 or may be detachable.

The imaging system 200 further includes a general control/operation unit 218 that performs various calculations and controls the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, an imaging system to which the photoelectric conversion device 100 according to the first to fifth embodiments is applied may be realized.

Seventh Embodiment

Figure 20A:
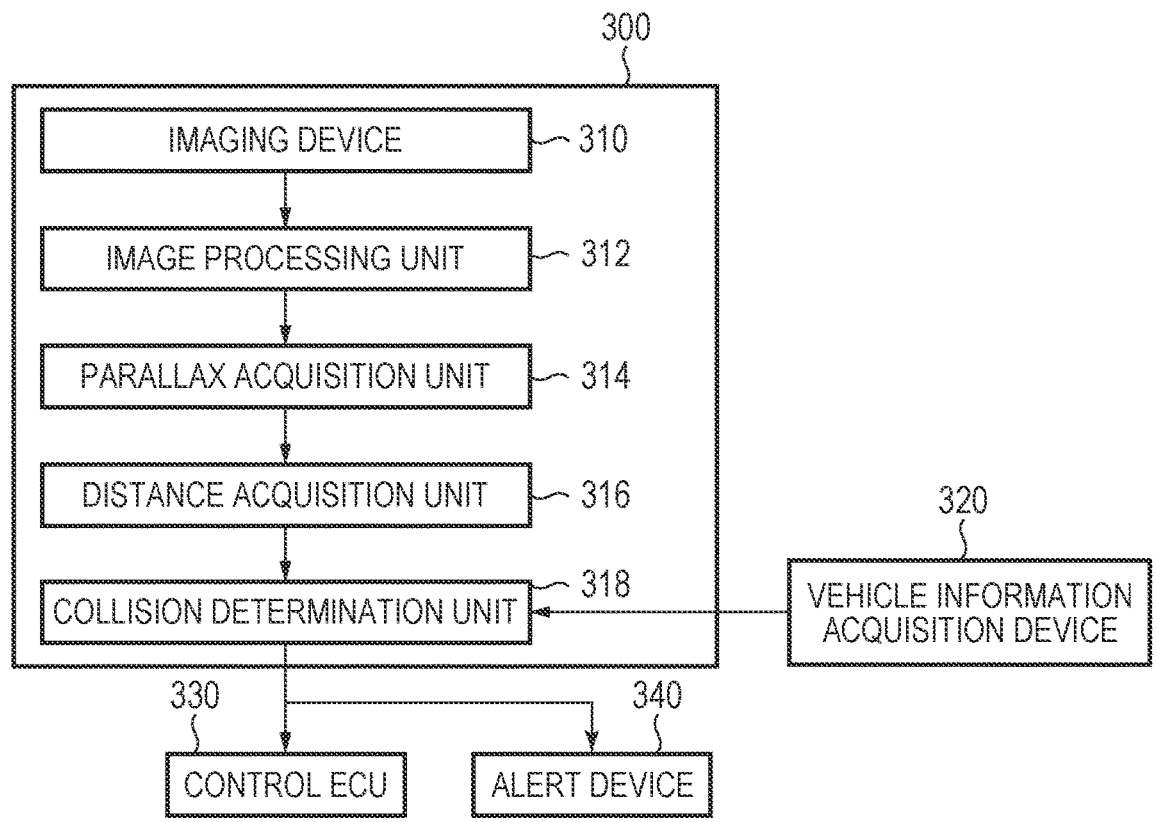
FIG. 20A is a diagram illustrating a configuration example of an imaging system according to a seventh embodiment of the disclosure.
Figure 20B:
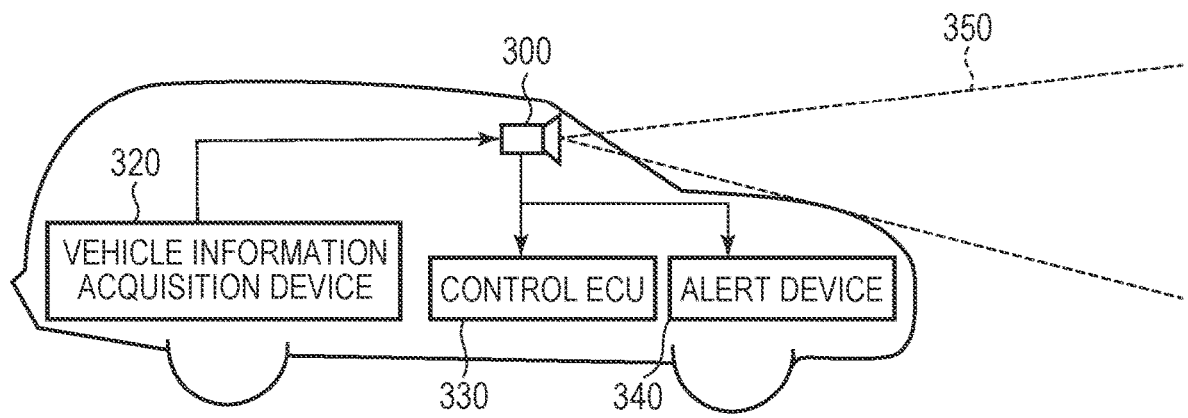
FIG. 20B is a diagram illustrating a configuration example of a movable object according to a seventh embodiment of the disclosure.

An imaging system and a movable object according to a seventh embodiment of the disclosure will be described with reference to FIG. 20A and FIG. 20B. FIG. 20A is a diagram illustrating a configuration of an imaging system according to the present embodiment. FIG. 20B is a diagram illustrating a configuration of a movable object according to the present embodiment.

FIG. 20A illustrates an example of an imaging system related to an in-vehicle camera. The imaging system 300 includes an imaging device 310. The imaging device 310 is the photoelectric conversion device 100 according to any one of the first to fifth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 also includes a distance acquisition unit 316 that calculates the distance to an object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to the object. That is, the distance information is information related to parallax, defocus amount, distance to an object, and the like. The collision determination unit 318 may determine the possibility of collision using any of the distance information. The distance information acquisition means may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues an alert to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alert information on a screen of a car navigation system or the like, and provides a warning to the user by applying vibration to a seatbelt or steering.

In the present embodiment, an image of the periphery of the vehicle, for example, the front or the rear is captured by the imaging system 300. FIG. 20B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the disclosure is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (mobile device) such as a ship, an aircraft, or an industrial robot. In addition, the disclosure may be applied not only to a movable object but also to an apparatus using object recognition in a wide range such as an advanced road traffic system (ITS).

Modified Embodiments

The disclosure is not limited to the above embodiments, and various modifications are possible.

For example, an example in which a configuration of a part of any embodiment is added to another embodiment or an example in which a configuration of a part of another embodiment is substituted is also an embodiment of the disclosure.

The circuit configuration of the pixel 12 illustrated in FIG. 2 is an example, and may be changed as appropriate. For example, a pixel configuration in which a charge holding portion is further provided separately from the floating diffusion portion FU and a global electronic shutter operation may be performed may be employed.

The imaging systems described in the sixth and seventh embodiments are examples of an imaging system to which the photoelectric conversion device of the disclosure may be applied, and the imaging system to which the photoelectric conversion device of the disclosure may be applied is not limited to the configurations illustrated in FIG. 19 and FIG. 20A.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-016652, filed Feb. 4, 2021 which is hereby incorporated by reference herein in its entirety.

What is claimed is:
1. A photoelectric conversion device comprising:
a pixel array unit in which a plurality of pixels each including a photoelectric converter is arranged to form a plurality of columns;
a plurality of output lines that is provided corresponding to the plurality of columns and each of which a first signal and a second signal are to be output from the pixel; and
a plurality of column circuits that is provided corresponding to the plurality of output lines,
wherein each of the plurality of column circuits includes a sample-and-hold unit including a first sample-and-hold circuit that holds the first signal and a second sample-and-hold circuit that holds the second signal,
wherein each of the first sample-and-hold circuit and the second sample-and-hold circuit includes a plurality of unit capacitors and a switch circuit provided between the output line and the plurality of unit capacitors,
wherein the switch circuit includes a plurality of first switches respectively provided between the output line and first electrodes of the plurality of unit capacitors, and a plurality of second switches respectively provided between the first electrodes of adjacent unit capacitors,
wherein second electrodes of the plurality of unit capacitors of the first sample-and-hold circuit are connected to each other by a first interconnection, and second electrodes of the plurality of unit capacitors of the second sample-and-hold circuit are connected to each other by a second interconnection,
wherein the plurality of second switches constituting the switch circuits of the first sample-and-hold circuit and the second sample-and-hold circuit are arranged along a first direction parallel to the plurality of columns, and
wherein the first interconnection and the second interconnection extend along the first direction.
2. The photoelectric conversion device according to claim 1, wherein in each of the first sample-and-hold circuit and the second sample-and-hold circuit, the plurality of unit capacitors is arranged adjacent to each other along the first direction.

3. The photoelectric conversion device according to claim 1, wherein in each of the first sample-and-hold circuit and the second sample-and-hold circuit, a plurality of unit capacitor portions each including the first switch, the second switch, and the unit capacitor are arranged adjacent to each other along the first direction.

4. The photoelectric conversion device according to claim 1, wherein a first capacitor unit including the switch circuit and the plurality of unit capacitors of the first sample-and-hold circuit and a second capacitor unit including the switch circuit and the plurality of unit capacitors of the second sample-and-hold circuit are arranged along the first direction.

5. The photoelectric conversion device according to claim 4,
wherein the first sample-and-hold circuit further includes a first amplifier unit connected to the first interconnection,
wherein the second sample-and-hold circuit further includes a second amplifier unit connected to the second interconnection, and
wherein the first capacitor unit, the second capacitor unit, the first amplifier unit, and the second amplifier unit are arranged along the first direction.

6. The photoelectric conversion device according to claim 5, wherein the first amplifier unit and the second amplifier unit are adjacent to each other.

7. The photoelectric conversion device according to claim 5, wherein at least one of the first amplifier unit and the second amplifier unit is disposed between the first capacitor unit and the second capacitor unit.

8. The photoelectric conversion device according to claim 4, wherein the first capacitor unit and the second capacitor unit are adjacent to each other.

9. The photoelectric conversion device according to claim 1, wherein the unit capacitor of the first sample-and-hold circuit and the unit capacitor of the second sample-and-hold circuit are alternately arranged adjacent to each other along the first direction.

10. The photoelectric conversion device according to claim 1,
wherein each of the first sample-and-hold circuit and the second sample-and-hold circuit includes a plurality of unit capacitor portions each including the first switch, the second switch, and the unit capacitor,
wherein the unit capacitor portion of the first sample-and-hold circuit and the unit capacitor portion of the second sample-and-hold circuit are arranged adjacent to each other along the first direction.

11. The photoelectric conversion device according to claim 10, wherein the planar layout of the unit capacitor portion of the first sample-and-hold circuit and the planar layout of the unit capacitor portion of the second sample-and-hold circuit are the same.

12. The photoelectric conversion device according to claim 11, wherein at least one of the unit capacitor portion of the first sample-and-hold circuit and the unit capacitor portion of the second sample-and-hold circuit is provided with a dummy switch having the same structure as the switch element constituting the second switch.

13. The photoelectric conversion device according to claim 1, wherein a length of an electrical path connecting the pixel and the first sample-and-hold circuit and a length of an electrical path connecting the pixel and the second sample-and-hold circuit are the same.

14. The photoelectric conversion device according to claim 1, wherein the number of the unit capacitors of the first sample-and-hold circuit and the number of the unit capacitors of the second sample-and-hold circuit are the same.

15. The photoelectric conversion device according to claim 1,
wherein the first signal is a signal in accordance with an amount of incident light on the photoelectric converter, and
wherein the second signal is a signal based on a reset state of the pixel.

16. The photoelectric conversion device according to claim 15, wherein the sample-and-hold unit outputs a third signal corresponding to a difference between the first signal and the second signal.

17. The photoelectric conversion device according to claim 16, wherein the column circuit further includes an AD conversion unit that converts the third signal from an analog signal to a digital signal.

18. An imaging system comprising:
the photoelectric conversion device according to claim 1; and
a signal processing device that processes a signal output from the photoelectric conversion device.

19. A movable object comprising:
the photoelectric conversion device according to claim 1;
a distance information acquisition unit that acquires distance information to an object from a parallax image based on a signal output from the photoelectric conversion device; and
a control unit that controls the movable object based on the distance information.

20. A photoelectric conversion device comprising:
a pixel array unit in which a plurality of pixels each including a photoelectric converter is arranged to form a plurality of columns;
a plurality of output lines that is provided corresponding to the plurality of columns and each of which a first signal and a second signal are to be output from the pixel; and
a plurality of column circuits that is provided corresponding to the plurality of output lines,
wherein each of the plurality of column circuits includes a sample-and-hold unit including a first sample-and-hold circuit that holds the first signal and a second sample-and-hold circuit that holds the second signal,
wherein each of the first sample-and-hold circuit and the second sample-and-hold circuit includes a plurality of unit capacitors and a switch circuit provided between the output line and the plurality of unit capacitors,
wherein the switch circuit includes a plurality of first switches respectively provided between the output line and first electrodes of the plurality of unit capacitors, and a plurality of second switches respectively provided between the first electrodes of adjacent unit capacitors, and
wherein the unit capacitors of the first sample-and-hold circuit and the unit capacitors of the second sample-and-hold circuit are alternately arranged adjacent to each other along a first direction parallel to the plurality of columns.

* * * * *